US009581796B2

(12) United States Patent
Leonhardt et al.

(10) Patent No.: US 9,581,796 B2
(45) Date of Patent: Feb. 28, 2017

(54) IMAGING DEVICE AND METHOD

(75) Inventors: Ulf Leonhardt, St. Andrews (GB);
Tomas Tyc, Brno (CZ); Lucas Heitzmann Gabrielli, Ithaca, NY (US);
Michal Lipson, Ithaca, NY (US)

(73) Assignees: The University Court of the University of St. Andrews, St. Andrews (GB); Masaryk University, Brno (CZ); Cornell University, Ithaca, NY (US)

( * ) Notice: Subject to any disclaimer, the term of this patent is extended or adjusted under 35 U.S.C. 154(b) by 887 days.

(21) Appl. No.: 13/497,578

(22) PCT Filed: Sep. 3, 2010

(86) PCT No.: PCT/GB2010/051465
§ 371 (c)(1),
(2), (4) Date: Aug. 20, 2012

(87) PCT Pub. No.: WO2011/036469
PCT Pub. Date: Mar. 31, 2011

(65) Prior Publication Data

US 2012/0312969 A1   Dec. 13, 2012
US 2014/0097332 A2   Apr. 10, 2014
US 2014/0374576 A2   Dec. 25, 2014

(30) Foreign Application Priority Data

Sep. 23, 2009  (GB) .................................. 0916727.1

(51) Int. Cl.
*G02B 17/08*  (2006.01)
*G02B 3/00*   (2006.01)
(Continued)

(52) U.S. Cl.
CPC ......... *G02B 17/086* (2013.01); *G02B 3/0087* (2013.01); *G02B 27/58* (2013.01); *G02B 1/002* (2013.01)

(58) Field of Classification Search
CPC ........ F24J 2/06; F24J 2/085; F24J 2/40; G01J 1/04; G01J 1/0411; G01J 1/0422; G02B 17/086; G02B 3/0087
(Continued)

(56) References Cited

U.S. PATENT DOCUMENTS 4,278,887 A * 7/1981 Lipshutz ............ G01N 21/0303
250/432 R
5,677,796 A * 10/1997 Zimmerman .......... H01Q 15/08
343/911 L
(Continued)

FOREIGN PATENT DOCUMENTS

GB   2201527 A    9/1988
JP   2004212639 A  7/2004

OTHER PUBLICATIONS

Benitez, Pablo, et al., "Perfect Focusing of Scalar Wave Fields in Three Dimensions," Optics Express, vol. 18, No. 8, Apr. 12, 2010, pp. 7650-7663.
(Continued)

*Primary Examiner* — David Porta
*Assistant Examiner* — Don Williams
(74) *Attorney, Agent, or Firm* — Winstead PC

(57) ABSTRACT

The resolution of conventional imaging devices is restricted by the diffraction limit. 'Perfect' imaging devices which can achieve a resolution beyond the diffraction limit have been considered impossible to implement. However, the present disclosure provides an imaging device which can achieve improved resolution beyond the diffraction limit and which can be implemented in practice. Said imaging device com-
(Continued)

prises: a. a lens having a refractive index that varies according to a predetermined refractive index profile; b. a source; c. an outlet for decoupling waves from the device; and d. a reflector provided around the lens, the source and the outlet, wherein the reflector and the refractive index profile of the lens are together arranged to direct waves transmitted in any of a plurality of directions from the source to the outlet.

37 Claims, 20 Drawing Sheets

(51) Int. Cl.
G02B 27/58 (2006.01)
G02B 1/00 (2006.01)

(58) Field of Classification Search
USPC ............... 250/208.1, 216, 559.22, 228, 239; 356/128, 132; 385/14, 33, 34; 359/34, 359/215, 364, 380, 387, 529, 542, 543, 359/584, 652; 126/593, 683, 698, 700; 136/215
See application file for complete search history.

(56) References Cited

U.S. PATENT DOCUMENTS

| | | | |
|---|---|---|---|
| 5,808,806 A | 9/1998 | Guhman et al. | |
| 7,511,891 B2* | 3/2009 | Messerschmidt .. | G02B 21/0028 359/652 |
| 2003/0026536 A1* | 2/2003 | Ho ................... | 385/33 |
| 2006/0139763 A1* | 6/2006 | Satzke ................ | B82Y 20/00 359/652 |
| 2006/0229515 A1* | 10/2006 | Sharareh ............. | A61B 5/0075 600/476 |
| 2007/0285617 A1* | 12/2007 | Mills ................ | B29D 11/00355 351/159.74 |
| 2008/0157142 A1* | 7/2008 | Park .................. | H01L 27/14627 257/292 |

OTHER PUBLICATIONS

Blaikie, R.J., "Comment on 'Perfect Imaging Without Negative Refraction,'" *New Journal of Physics* 12 058001, published May 20, 2010, 4 pages.
Born, Max, et al., "Principles of Optics: Electromagnetic Theory of Propagation, Interference and Diffraction of Light," (Cambridge University Press, 1999), pp. 152-159.
Cai, Wenshan, et al., "Superlens Based on Metal-Dielectric Composites," Phys. Rev. B 72. 193101 (2005), 4 pages.
Chen, H., et al., "Tranformation Optics and Metamaterials," Nat. Mater. 9, 387-396, May 2010.
Fang, Nicholas, et al., "Sub-Diffraction Limited Optical Imaging With a Silver Superlens," Science 308, 534-537, Apr. 22, 2005.
Cornbleet, S., "Microwave Optics: The Optics of Microwave Antenna Design," (Academic Press, 1976), 8 pages.
Demkov, Yu. N., et al., "Uniqueness of the Firsov Inversion Method and Focusing Potentials", Soviet Physics JETP, vol. 33, No. 5, pp. 867-870, Nov. 1971.
Fuchs, Banjamin, et al., "Design and Characterization of Half Maxwell Fish-Eye Lens Antennas in Millimeter Waves," IEEE Transactions on Microwave Theory and Techniques, vol. 54, No. 6, Jun. 2006, pp. 2292-2300.
Erdélyi, A., et al., "Higher Transcendental Functions," vol. 1, (New York: McGraw-Hill), 1981, 22 pages.
Foca, E., et al., "Superlensing With Plane Plates Consisting of Dielectric Cylinders in Glass Envelopes," Phys. Status Solidi A 206, No. 1 (2009), pp. 140-146.
Gabrielli, Lucas H., "Silicon Nanostructure Cloak Operating at Optical Frequencies," Nature Phototonics, vol. 3, Aug. 2009, pp. 461-463.
Glaser, W., "Maxwell's 'Fish Eye' as an Ideal Electron Lens," Nature 162, Sep. 18, 1948, pp. 455-456.
Greenwood, Andrew D., "A Field Picture of Wave Propagation in Inhomogeneous Dielectric Lenses," IEEE Antennas and Propagation Magazine, vol. 41, No. 5, Oct. 1999, pp. 9-18.
Dutt, M. V. Gurudev, "Quantum Register Based on Individual Electronic and Nuclear Spin Qubits in Diamond," *Science* 316, 1312 (2007), pp. 1312-1316.
Heller, E. J., et al., "Scattering and Absorption of Surface Electron Waves in Quantum Corrals," Nature, vol. 369, Jun. 9, 1994, pp. 464-466.
Hendi, Awatif, et al., "Ambiguities in the Scattering Tomography for Central Potentials," Physical Review Letters 97, 2006, pp. 073902-1-073902-4.
Jackson, John David, *Classical Electrodynamics*, Chapter 2, John Wiley & Sons, Inc., 1999, pp. 57-60.
Kawata, Satoshi, et al., "Plasmonics for Near-Field Nano-Imaging and Superlensing," Nature Phototonics, vol. 3, Jul. 2009, pp. 388-394.
Landau, L. D., et al., "Electrodynamics of Continuous Media," (Oxford: Butterworth Heinemann), 1993, pp. 304-305.
Lenz, W., "Zur Theorie der Optischen Abbildung," contribution in *Probleme der Modernen Physik ed*, P. Debye (Leipzig: Hirzel) 1928.
Lee, J. H., "Direct Visualization of Optical Frequency Invisibility Cloak Based on Silicon Nanorod Array," Optics Express, vol. 17, No. 15, 20 Jul. 2009, pp. 12922-12928.
Leonhardt, Ulf, et al., "Notes on Conformal Invisibility Devices," *New Journal of Physics* 8, 2006, pp. 1-16.
Leonhardt, Ulf, "Towards Invisibility in the Visible," *Nature Materials*, vol. 8, Jul. 2009, pp. 537-538.
Leonhardt, Ulf, et al., "General Relativity in Electrical Engineering," *New Journal of Physics* 8 (2006), pp. 1-18.
Leonhardt, Ulf, et al., "Broadband Invisibility by Non-Euclidean Cloaking," *Science* 323, 110 (2009) pp. 110-112.
Leonhardt, Ulf, et al., "Optical Conformal Mapping," *Science* 312, 1777 (2006) pp. 1777-1780.
Leonhardt, Ulf, "Reply to Comment on 'Perfect Imaging Without Negative Refraction,'" *New Journal of Physics* 12 (2010) pp. 1-3.
Li, Jensen, et al., "Hiding Under the Carpet: A New Strategy for Cloaking," PRL 101 (2008) pp. 203901-1-203901-4.
Liu, Zhaowei, et al., "Far-Field Optical Hyperlens Magnifying Sub-Diffraction-Limited Objects," Science, vol. 315, Mar. 23, 2007, p. 1686.
Luneburg, R. K., "Mathematical Theory of Optics," University of California Press, Berkeley and Los Angeles, 1964, 6 pages.
Ma, et al., An Omnidirectional Retroreflector Based on the Transmutation of Dielectric Singularities, Nature Materials 8, Aug. 2009, pp. 639-642.
Makowski, A.J., et al., "Quantization of the Maxwell Fish-Eye Problem and the Quantum-Classical Correspondence," Physical Review A 79, 2009, 6 pages.
Marques, Ricardo, "Theory of Three-Dimensional Subdiffraction Imaging," Appl. Phys. Lett. 89, 2006, 4 pages.
Pendry, et al., "Controlling Electromagnetic Fields," *Science* 312, 1780 (2006), 4 pages.
Pendry, J.B., "Negative Refraction Makes a Perfect Lens," Physical Review Letters, vol. 85, No. 18, Oct. 30, 2000, pp. 3966-3969.
Schurig, D., et al., "Calculation of Material Properties and Ray Tracing in Transformation Media," Optics Express, vol. 14, No. 21, Oct. 16, 2006, 11 pages.
Smith, D.R., et al., "Metamaterials and Negative Refractive Index," Science, vol. 305, Aug. 6, 2004, pp. 788-792.
Soukoulis, Costas M., et al., "Negative Refractive Index at Optical Wavelengths," Science, vol. 315, Jan. 5, 2007, 5 pages.
Stettler, R., *Optik* 12, 1955, pp. 529-543.
Veselago, V. G., "The Electrodynamics of Substances With Simultaneously Negative Values of $\epsilon$ and $\mu$," Soviet Physics Uspekhi, vol. 10, No. 4, Jan.-Feb. 1968, pp. 509-514.
Needham, Tristan, "Visual Complex Analysis," (Oxford: Clarendon), 2002, 6 pages.

(56) References Cited

OTHER PUBLICATIONS

Rosu, H., et al., "Electromagnetic Modes of Maxwell Fisheye Lens," Il Nuovo Cimento, vol. 16D, N. 5, 1994, pp. 517-522.

Schleich, Wolfgang, et al., "General Relativity and Modern Optics," New Trends in Atomic Physics (Amsterdam: Elsevier), 1984, 15 pages.

Tyc, T., et al., "Non-Euclidean Cloaking for Light Waves," IEEE Journal of Selected Topics in Quantum Electronics, vol. 16, No. 2, Mar./Apr. 2010, pp. 418-426.

Leonhardt, Ulf, et al., "Transformation Optics and the Geometry of Light," Progress in Optics, vol. 53, 2009, pp. 69-152.

Kildishev, Alexander V., "Engineering Space for Light Via Transformation Optics," Optics Letters, vol. 33, No. 1, Jan. 1, 2008, pp. 43-45.

Leonhardt, Ulf, et al., "Perfect Imaging with Positive Refraction in Three Dimensions," Physical Review, vol. A 81 (2010), pp. 011804-1-011804-4.

Leonhardt, Ulf, et al., "Perfect Imaging Without Negative Refraction," New Journal of Physics 11 (2009), pp. 1-13.

Salandrino, Alessandro, et al., "Far-Field Subdiffraction Optical Microscopy Using Metamaterial Crystals: Theory and Simulations," Physical Review B 74 (2006), pp. 075103-1-075103-5.

Shalaev, Vladimir M., "Transforming Light," Science, vol. 322, Oct. 17, 2008, pp. 384-386.

Spadoti, Danilo H., "Focusing Light in a Curved-Space," Optics Express, vol. 18, No. 3, Feb. 1, 2010, pp. 3181-3186.

Stockman, Mark I., "Criterion for Negative Refraction with Low Optical Losses from a Fundamental Principle of Causality," Physical Review Letters, vol. 98 (2007), pp. 177404-1-177404-4.

Tai, C.T., "Maxwell Fish-Eye Treated by Maxwell Equations," Nature, vol. 182, Dec. 6, 1958, pp. 1600-1601.

Valentine, Jason, et al., "An Optical Cloak Made of Dielectrics," Nature Materials (2009), 4 pages.

Jacob, Zubin, et al., "Optical Hyperlens: Far-Field Imaging Beyond the Diffraction Limit," Optics Express, vol. 14, No. 18, Sep. 4, 2006, pp. 8247-8256.

Oskooi, Ardavan F., et al., "Meep: A Flexible Free-Software Package for Electromagnetic Simulations by the FDTD Method," Computer Physics Communications 181.3 (2010), pp. 687-702.

Schurig, D., et al., "Metamaterial Electromagnetic Cloak at Microwave Frequencies," Science 314 (2006), pp. 977-980.

Smith, D.R., et al., "Homogenization of Metamaterials by Field Averaging (Invited Paper)," Optical Society of America, vol. 23, No. 3, Mar. 2006, pp. 391-403.

Zhao, L., et al., "Visual Observation and Quantitative Measurement of the Microwave Absorbing Effect at X Band," Review of Scientific Instruments, vol. 79 (2008), 6 pages.

Leonhardt, Ulf, et al., "Geometry and Light: The Science of Invisibility," (Dover Publications, 2010).

Thomson, W., et al., The Cambridge and Dublin Mathematical Journal, vol. VIII (1853).

Ward, Seamus, "International Search Report" for PCT/GB2010/051465, as mailed Nov. 23, 2010, 4 pages.

Shafer, David, "Some Odd and Interesting Monocentric Designs", Proceedings of the International Society for Optical Engineering (SPIE), vol. 5865, 586508, Aug. 1, 2005, pp. 58650801-58650811.

Leonhardt, Ulf, "Perfect imaging without negative refraction", New Journal of Physics, Institute of Physics Publishing, Bristol, Great Britain, vol. 11, No. 9, Sep. 29, 2009, 13 pages.

Minkel, Jr; "Focus: Left-Handed Materials Debate Heats Up"; Phys. Rev. Focus 9, 23; May 3, 2002; 3 pages.

Parimi, Patanjali V., et al.; "Photonic Crystals: Imaging by Flat Lens using Negative Refraction"; Nature, vol. 426; Nov. 27, 2003; p. 404.

Yao, Jie, et al.; "Optical Negative Refraction in Bulk Metamaterials of Nanowires"; Science, vol. 321, No. 5891; Aug. 15, 2008; p. 930.

Valentine, Jason, et al.; "Three-Dimensional Optical Metamaterial with a Negative Refraction Index"; Nature, vol. 455; Sep. 18, 2008; pp. 376-380.

Yao, S.K., et al.; "Guided-Wave Optical Thin-Film Luneburg Lenses: Fabrication Technique and Properties"; Applied Optics, vol. 18, No. 24; Dec. 15, 1979; pp. 4067-4079.

\* cited by examiner

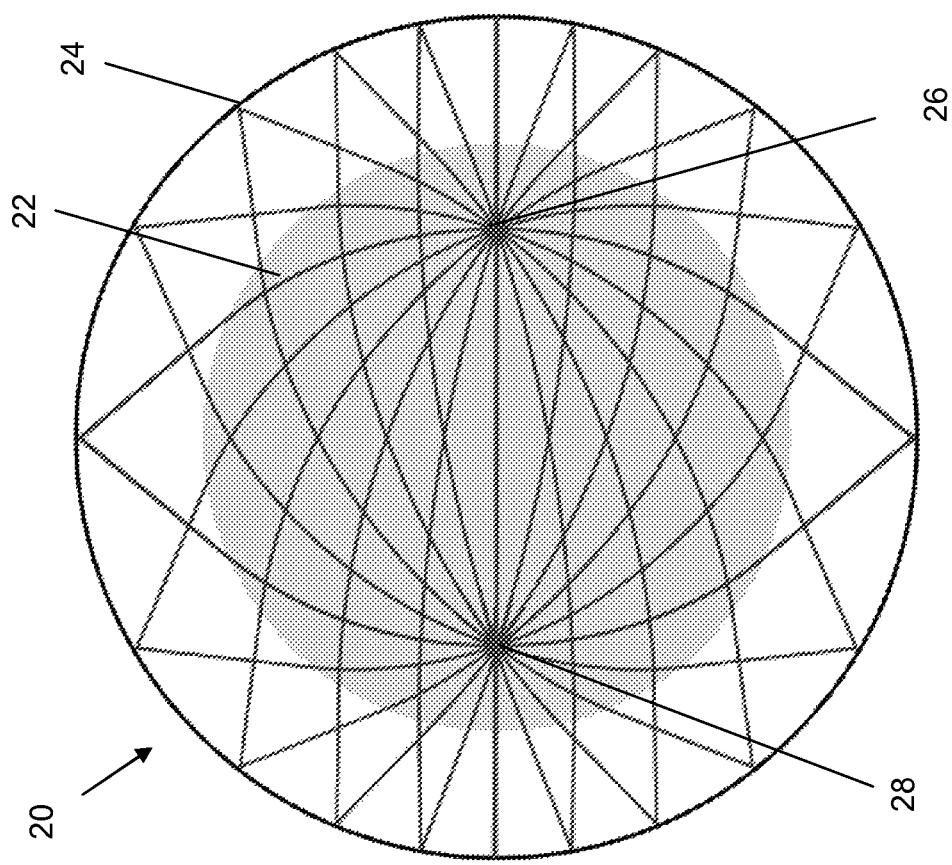
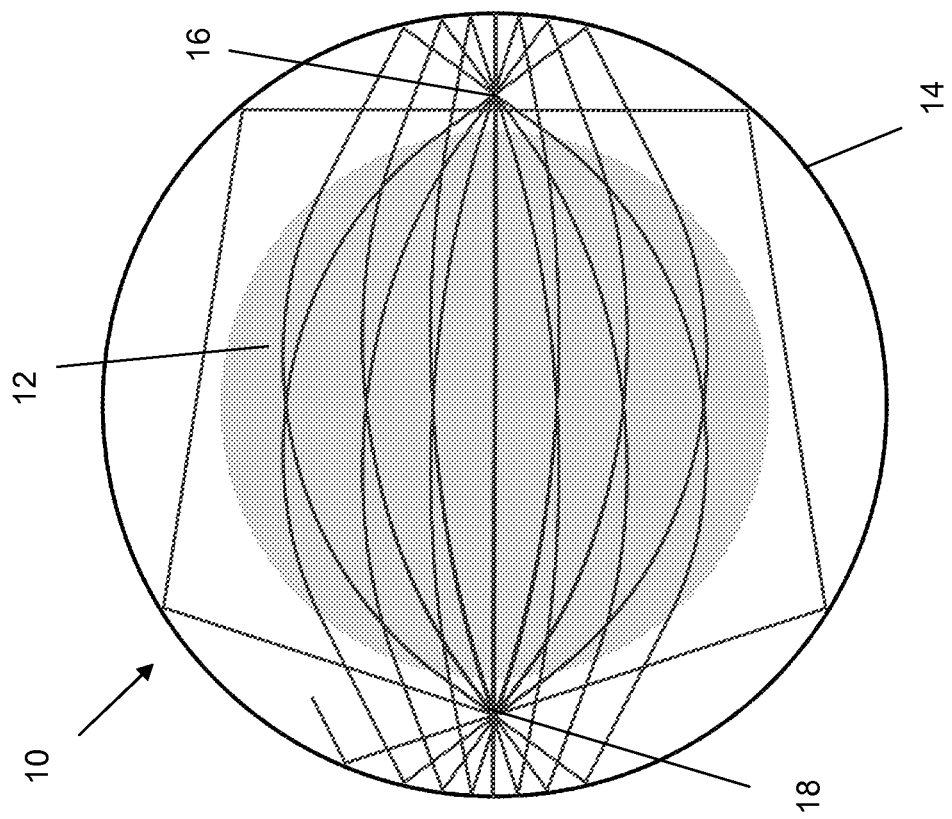
Figure 3b
Figure 3a

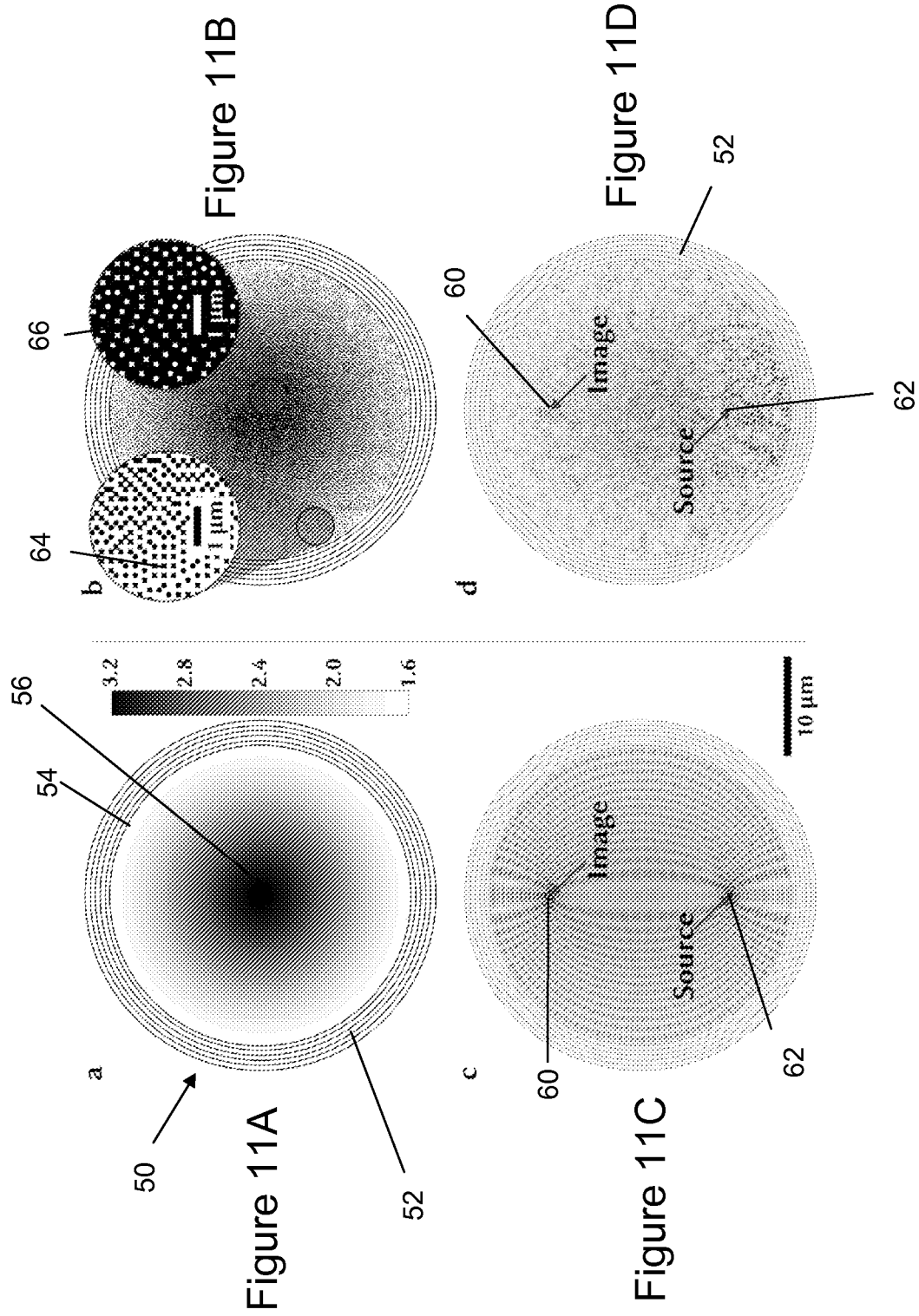

IMAGING DEVICE AND METHOD

FIELD OF INVENTION

The invention relates to an imaging device and an imaging method, and in particular to the field of perfect imaging.

BACKGROUND

Around 1870 the German physicist Ernst Abbe of the University of Jena established the theory of optical imaging and deduced the resolution limit of lenses. Before Abbe, making a good lens was a matter of trial and error. Abbe's theory enabled him and his collaborators, the optician Carl Zeiss and the entrepreneur Otto Schott, to create the modern optics industry. Carl Zeiss Jena is still a household name more than a hundred years later.

All conventional lenses have limited resolution. Even with the strongest microscope it is not possible to see atoms, molecules or nanostructures; for this electron or atomic-force microscopy is needed. The wavelength of light sets the resolution limit, half a micrometer for visible light.

In 2000, Sir John Pendry of Imperial College London published [Pendry J B 2000 *Phys. Rev. Lett.* 85 3966] a remarkable theoretical result: a lens made of a negatively refracting material (i.e. a lens that bends light in the opposite direction from a positively refracting material) is perfect in theory—that is a flat lens made of negatively-refracting material [Veselago V G 1968 *Sov. Phys.—Usp.* 10 509] can, in principle, image light with unlimited resolution, beyond Abbe's limit. Since then, negative refraction has been believed to be key to the achievement of perfect imaging.

Negative refraction occurs in materials with both negative dielectric c and p; it can also be realized in other cases, for example in photonic crystals [P. V. Parimi et al., Nature 426, 404 (2003)], but perfect imaging with negative refraction requires negative $\in$ and $\mu$. Negative refraction has been subject to considerable debate (see J. R. Minkel, Phys. Rev. Focus 9, 23 (2002) for a review) but the consensus of the majority of physicists working in this area is that negative refraction is real. In particular, experiments [J. Yao et al. Science 321, 930 (2008); J. Valentine et al., Nature 455, 376 (2008)] demonstrated a negative Snell's law of refraction for infrared light.

The quest for the perfect lens thus initiated and inspired the rise of research on metamaterials, believed to be capable of negative refraction [Veselago V G 1968 *Sov. Phys.—Usp.* 10 509] (an optical property not readily found in natural materials).

Metamaterials may be engineered to exhibit negative refraction (see Smith D R, Pendry J B and Wiltshire M C K 2004 *Science* 305 788 and Soukoulis C M, Linden S and Wegener M 2007 *Science* 315 47), but in such cases they tend to be absorptive and narrowband, for fundamental reasons. In particular, Stockman [Stockman M I 2007 *Phys. Rev. Lett.* 98 177404] showed that negative refraction is always restricted to a small bandwidth and can only occur in dissipative materials. Thus, in practice, the fact that negatively refracting materials absorb light quickly thoroughly spoils their imaging potential. In addition, the super-resolution is easily lost when the lens becomes comparable in thickness to the wavelength; only "poor-man's lenses" that are substantially thinner than the wavelength have shown sub-wavelength imaging beyond the diffraction limit [N. Fang et al, Science 308, 534 (2005)].

The resolution limit of lenses limits the microchip technology needed for making ever faster computers. Chipmakers photograph the structures of billions of tiny transistors on silicon chips. To meet the insatiable appetite for more and more transistors that need to be smaller and smaller, the resolution limit of lenses forces chipmakers to use light with ever shorter wavelength, which gets increasingly difficult. An alternative imaging method which allows improved resolution is therefore required.

Suggested alternatives to negatively refracting materials include hyperlenses [Z. Jacob, L. V. Alekseyev, and E. Narimanov, Opt. Express 14, 8247 (2006)] that rely on materials with indefinite metric. These lenses are made from anisotropic materials where one of the eigenvalues of c is negative; these materials thus implement a hyperbolic geometry (hence the name hyperlens). Hyperlenses are able to funnel out light from nearfields without losing sub-wavelength detail, but their resolution is determined by their geometric dimensions, and is thus not unlimited.

SUMMARY OF INVENTION

A first aspect of the disclosure provides an imaging device comprising:
  a. a lens having a refractive index that varies according to a predetermined refractive index profile;
  b. a source;
  c. an outlet for decoupling waves from the device; and
  d. a reflector provided around the lens, the source and the outlet,
  wherein the reflector and the refractive index profile of the lens are together arranged to direct waves transmitted in any of a plurality of directions from the source to the outlet.

It appears to be impossible to implement a lens with a refractive index profile which is alone suitable for directing waves transmitted in any of a plurality of directions from the source to the outlet. However, the inventor has realised that, by providing a reflector around the lens, source and the outlet, it is possible to produce a lens with a refractive index profile which, together with the reflector, can fulfil this function. As this is a key requirement for achieving imaging with perfect resolution, the imaging device according to the first aspect of the disclosure can achieve improved image resolution compared to conventional lenses. The refractive index profile may take any form which, together with the reflector, can fulfil this function. In one embodiment, the refractive index conforms to a generalised Luneburg focusing profile (see equation (II) in Section 1 below). In this case, a gap is provided between an edge of the lens and the reflector. In an alternative embodiment, the refractive index may conform to a Maxwell fish-eye focusing profile (see equation (XI) in Section 1 below). In this case, the reflector is adjacent the lens.

Preferably, the outlet is opposite the source. In one embodiment, the lens is substantially circular when viewed in plan. In this case, the outlet is preferably diametrically opposite the source.

By enabling waves to be imaged beyond the diffraction limit, structures smaller than the wavelength of the waves can be imaged. This makes the imaging of nanostructures significantly easier, where currently light of extremely small wavelength (such that the structures are larger than the wavelength) needs to be used to image these small structures. This disclosure is therefore particularly suited for use in nanolithography.

The imaging device according to the first aspect of the disclosure is capable of focusing multiple waves transmitted from the source at the outlet.

Typically, the waves are electromagnetic waves (for example but not exclusively, the waves may be ultraviolet, visible light, microwaves or infrared radiation) or sound waves.

The lens may have a three dimensional shape such as a hemisphere, but preferably the lens is substantially planar (i.e. substantially two dimensional). In this case, where the radiation is electromagnetic, the light is preferably TE polarised. By TE polarization it is meant that the electric field points in the orthogonal direction to the plane of the lens.

Perfect imaging beyond the diffraction limit is only possible if an outlet is present that decouples the waves from the device. Otherwise the focused waves are reflected at the image where they change sign; the sign change averaged over the oscillations of the wave creates a fuzzy image that conforms to the standard diffraction limit. Using an outlet eliminates this and allows perfect imaging. In one embodiment, the outlet comprises an image detector for absorbing waves. For example, but not exclusively, the image detector may comprise a layer of photo-resistive or photographic material, a photodiode, or a CCD or CMOS pixel array. Alternatively, the outlet may comprise a wave collector, such as an optical fibre, or a reflector (as long as it can fulfil its function of decoupling waves from the device). The outlet may be located anywhere within an inner boundary of the reflector (although its position is typically dependent on the position of the source). In one embodiment, the outlet is embedded in the lens but preferably the outlet is positioned on an external surface of the lens. This arrangement facilitates efficient image transfer from the imaging device without needing an outlet to be embedded in the lens. The outlet may alternatively be positioned in a gap between the lens and the reflector.

The source may also be positioned anywhere within the boundary of the reflector but preferably, the lens comprises the source and the outlet.

In one embodiment, the lens, source and outlet all lie on the same plane. In this case, the reflector typically surrounds the lens, source and outlet in two dimensions on said plane. Additionally or alternatively, in this case, the waves are typically transmitted from the source in any of a plurality of directions on said plane.

Preferably, the waves are directed from the source to the outlet along a closed trajectory such that, in the absence of the outlet, the waves would be directed back to the source by the lens and the reflector.

The refractive index profile may be provided by a structured material/metamaterial. This is a material that contains structures smaller than the wavelength of illumination to be imaged, but larger than molecular dimensions. An example is a photonic-crystal fibre, also called microstructured fibre, which contains airholes in the glass along the fibre. However, more preferably, the refractive index profile is a graded refractive index profile. A "graded index profile" can be defined as a refractive-index profile that varies gradually (and continuously). Such profiles can be made by doping or mixing materials (an example is a graded-index optical fibre). For example, but not exclusively, the lens may be formed from a mixture of silica (refractive index 1.45) and silicon nitride (refractive index 2) and the graded refractive index profile ranges from 1.45 to 2. Alternatively, such a profile may be made by doping a dielectric material. A graded index profile is to be distinguished from a structured material/metamaterial (described above). By making the refractive index profile a graded refractive index profile, the image resolution is not limited by any substructures within the lens. Conversely, if the refractive index profile is formed by a structured material/metamaterial, the substructures may limit the image resolution (although the image resolution may still be beyond the diffraction limit). Thus, a graded index profile can provide even greater image resolution.

An alternative to a graded index profile is a tapered waveguide [see e.g. S. K. Yao et al., Appl. Opt. 18, 4067 (1979)]. Here a gradually varying index profile is established by varying the thickness of a layer with given refractive index on a substrate. The layer, acting as a waveguide, confines and supports the radiation. Its thickness gives rise to an effective refractive index that varies according to the layer profile.

Preferably, the lens is formed from an isotropic dielectric. This enables perfect imaging of a broad-band light source.

Preferably, the source comprises means for coupling waves into the imaging device. In one embodiment, the source is the object to be imaged (such as a nanostructure). In this case, the object may, for example, be illuminated by an external light wave source, the object reflecting or scattering the light waves into the lens. When the waves are directed to the outlet from the object by the lens and the reflector, a perfect image of the object is formed at the outlet.

In the example illustrated in Section 3 of this disclosure, a gold dot serves as the object and the dot is illuminated by a focused laser beam. In the example illustrated in Section 4 of this disclosure, the source is a coaxial cable. In this case, the cable is brought into contact with the outer surface of the lens and microwaves are transmitted through the cable into the lens.

The lens and reflector may have any shape. This shape can be applied by Optical Conformal Mapping [U. Leonhardt, Science 312, 1777 (2006)]. In this case the refractive index profile and the shape of the reflector is deformed by a conformal transformation.

Typically, the reflector is substantially annular when viewed in plan. In this case, the lens is preferably located in an annulus of the reflector. More preferably, the lens may be concentric with the annulus of the reflector.

In one embodiment the lens is substantially circular when viewed in plan. When the lens is circular and the reflector annular, the annulus of the reflector preferably has a larger radius than the lens. In this case, the refractive index profile of the lens may conform to a generalised Luneburg profile. In an alternative embodiment, the annulus of the reflector and the lens have substantially identical radii. In this case, the refractive index profile of the lens may conform to a Maxwell fish-eye profile.

In one embodiment, the lens is rotationally symmetric and varies along a radius r with the refractive index profile n(r) given by the following implicit equations:

$$r(\rho) = \rho \exp\left(-\frac{2}{\pi} \int_{\rho}^{r_0} \frac{\arcsin(b/r_1)}{\sqrt{b^2 - \rho^2}} db\right)$$

$$n = \rho / r(\rho)$$

wherein:

$\rho$ is a parameter ranging from 0 to $r_0$;

$r_0$ is the radius of the lens; and $r_1$ is the radius of the reflector; and b is an integration variable.

In this case, the lens has a maximum refractive index, $n_0$, which conforms with the following equation:

$$n_0 = \exp\left(\frac{2}{\pi}\int_0^{r_0} \arcsin(b/r_1)\frac{db}{b}\right) = \exp\left(\frac{2}{\pi}\int_0^{r_0/r_1} \arcsin\xi \frac{d\xi}{\xi}\right)$$

wherein.
  $r_0$ is the radius of the lens;
  $r_1$ is the radius of the reflector; and
  $\xi$ is an integration variable.

The permittivity of the lens is typically equal to the square of its refractive index.

A second aspect of the disclosure comprises an imaging method using an imaging device comprising:
  a. a lens having a refractive index that varies according to a predetermined refractive index profile;
  b. a source;
  c. an outlet for decoupling waves from the device; and
  d. a reflector provided around the lens, the source and the outlet,
the method comprising: transmitting waves from the source in a plurality of directions; using the lens and the reflector to direct the transmitted waves to the outlet; and decoupling at least a portion of the directed waves from the device using the outlet.

In one embodiment, waves are transmitted from the source omnidirectionally.

Typically, a plurality of waves are focussed at the outlet.

In one embodiment, the lens, source and outlet all lie on the same plane. Additionally or alternatively, the lens may be substantially planar. In this case, when the waves are electromagnetic waves, it is preferable that the electric field component of the electromagnetic waves is substantially perpendicular to the plane of the lens. Also in this case, the waves are transmitted from the source in the plane of the lens.

As indicated above, new methods are proposed and new products can be made.

Products may include a lens with a refractive index that varies according to a given formula or principle encircled by a mirror. Preferably, said variation of refractive index may be achieved with a graded refractive index profile.

The "given formula or principle" may for example be derived from Luneburg's focusing profile, namely a refractive-index profile that focuses rays from any point on a circle to the opposite point on the circle. Not all rays need to be focused, but a continuous set of rays.

Luneburg developed mathematical methods for calculating such profiles that are published in his posthumous book R. K. Luneburg, Mathematical Theory of Optics, (University of California Press, Berkeley and Los Angeles, 1964).

In this disclosure, a mirror can be put at the focusing circle. The inventor has realised that this turns Luneburg's focusing profile into a perfect imaging device.

Imaging with conventional lenses is limited by the diffraction limit: details comparable in size with (or smaller than) half the wavelength of the imaging radiation cannot be resolved. The imaging device according to this disclosure is capable of imaging beyond this limit (commonly known as the 'diffraction limit').

Conformal transformations of this device [U. Leonhardt, Science 312, 177 (2006)] (including the mirror) have the same functionality but may assume different forms, which may be advantageous in practice.

General concepts and specific embodiments can be derived from the following descriptions. Various improvements and modifications can be made without departing from the scope of the invention.

BRIEF DESCRIPTION OF FIGURES

An embodiment of the invention will now be described, by way of example only, with reference to the drawings, in which:

FIG. 3A is a schematic plan view of a first modified fish-eye mirror which conforms to the generalised Luneburg profile. Light is emitted from a point outside the focusing index profile and not all rays are focused at the image point in this instance;

FIG. 3B is a schematic plan view of a second modified fish-eye mirror which conforms to the generalised Luneburg profile. In this case, perfect imaging is achieved if the light is emitted inside the refractive index profile;

In FIG. 6A, a line is drawn from the North Pole N through each point {X,Y,Z} on the surface of the sphere. Where this line intersects the plane through the Equator lies the projected point {x,y} (Y and y not shown here). The Northern Hemisphere is mapped to the exterior of the Equator with N at ∞, while the Southern Hemisphere is mapped to the interior; the South Pole S appears at the origin. In FIG. 6B, circles on the sphere are projected into circles on the plane. Light rays follow the geodesics, the great circles on the sphere. All the rays emitted from one point meet again at the antipodal point, forming a perfect image there. FIG. 6C illustrates how the light circles meet in the stereographic projection.

FIG. 7 shows how circles on the Northern Hemisphere are magnified, requiring refractive indices below the index on the sphere, $n_1$. Circles on the Southern Hemisphere (not shown) are reduced by maximally a factor of two; the index ranges from $n_1$ to $2n_1$ in the interior of the Equator. Maxwell's fish eye with the index profile of equation (1) turns out to perform the stereographic projection, see equation (5).

In FIG. 8A, a mirror at the Equator of the sphere creates the illusion that light rays perform complete great circles, whereas in reality they are reflected.

FIGS. 9A and 9B illustrate the needle-sharp imaging in Maxwell's fish eye.

FIGS. 11A-D show time-domain simulations of Maxwell's fish eye with, in FIG. 11A a continuous gradient index medium, and in FIG. 11B a discretized medium composed of silicon nanostructures. The point source (on the lower half) is clearly imaged on the upper half of the continuous devices in FIG. 11C and the discretized devices in FIG. 11D;

FIG. 12A is a view of the complete device, surrounded by a distributed Bragg reflector. FIG. 12B is a zoomed-in view of the region surrounding the scattering source used to couple light into the device; and FIG. 12C is a zoomed-in view of the region at the edge of the device;

FIG. 16 also shows the designed profile of the electric permittivity $\in=n^2$ at each layer of the device compared with Maxwell's theoretical formula.

FIG. 17A schematically illustrates a scheme of two experiments where microwaves may run from the source to one or two outlets that play the role of detectors. FIG. 17B shows the modulus squared of the scanned electric-field amplitude for the case when the outlet is placed at the correct image point; $\lambda_0$ indicates the free-space wavelength. FIG. 17C shows the modulus squared of the scanned electric-field amplitude where a second outlet is added at subwavelength distance from the first one. The two intensity profiles of FIGS. 17B and 17C show sharp peaks at the correct image point that are nearly indistinguishable, proving that the radiation goes into the right outlet/detector with subwavelength resolution.

FIG. 18A shows the real part and FIG. 18B shows the imaginary part of the complex Fourier amplitude. These figures show a running wave in good agreement with theory; the deviations from theory are primarily due to imperfections in source and outlet.

In FIG. 19A, the scheme of the experiment is shown, where microwaves are emitted and reabsorbed by the source as no outlet is present.

FIG. 20A shows the real part and FIG. 20B shows the imaginary part of the complex Fourier amplitude. These Figures show a standing wave in very good agreement with theory; the subwavelength features near the image originate from the structures of the material used to implement the fish eye mirror, the deviation near the source is due to its imperfection.

DESCRIPTION OF SPECIFIC EMBODIMENTS

For clarity, the references cited in each of the following sections (1 to 4) are listed separately in an appendix at the end of this description of specific embodiments. Reference numbering is restarted at the beginning of each section.

Section 1: Introduction to Perfect Imaging

As indicated in the Background, most physicists have until now believed that negative refraction was needed for perfect imaging, requiring artificial materials that are difficult to make in practice. In addition, perfect optical instruments without the physical problems of negative refraction have been suggested (see Maxwell J C 1854 *Camb. Dublin Math. J.* 8 188; Lenz W 1928 contribution in *Probleme der ModernenPhysik* ed P Debye (Leipzig: Hirzel); Stettler R 1955 *Optik* 12 52; Luneburg R K 1964 *Mathematical Theory of Optics* (Berkeley, Calif.: University of California Press); and Born M and Wolf E 1999 *Principles of Optics* (Cambridge: Cambridge University Press)), but they have only been proven to be perfect for light rays, not for waves. For example, Maxwell's fish eye, which uses positive refraction, has been known, as a theoretical idea, since a paper by Maxwell [J. C. Maxwell, Cambridge and Dublin Math. J. 8, 188 (1854)]. Maxwell's fish eye focuses all light rays emitted from any point at an exact image point; this makes it a perfect lens for light rays. However, it has been generally assumed that the resolution of such optical instruments would be limited by the wave nature of light, thus making such lenses imperfect. It is also considered to be extremely difficult (if not impossible) to make a conventional Maxwell fish-eye lens in practice.

The term perfect imaging is used to mean: the transfer of waves from one place to another, forming a real image at the new location with all the details of the original preserved. The spot-size of the image at the new location can, in principle, be made infinitesimally small—that is, its minimum size is not limited by the diffraction limit associated with conventional lenses.

Research on invisibility has shown that imaging in ordinary (positively refracting) materials may be equally perfect (compared with negatively refracting materials) and much easier to implement in practice.

Designing perfect lenses with radial symmetry is an inverse scattering problem. A theoretical solution was proposed by Rudolf K. Luneburg in his 1944 lectures on optics at Brown University and was later published in his posthumous book [1]. Here we use the notation of Ref. [2] where a visual interpretation of scattering tomography was developed. We add a mirror (or reflector—these terms will be used interchangeably but are used to mean any reflective element or reflecting means) to Luneburg's case. As described below, the presence of the mirror has a surprisingly beneficial effect.

Figure 1:
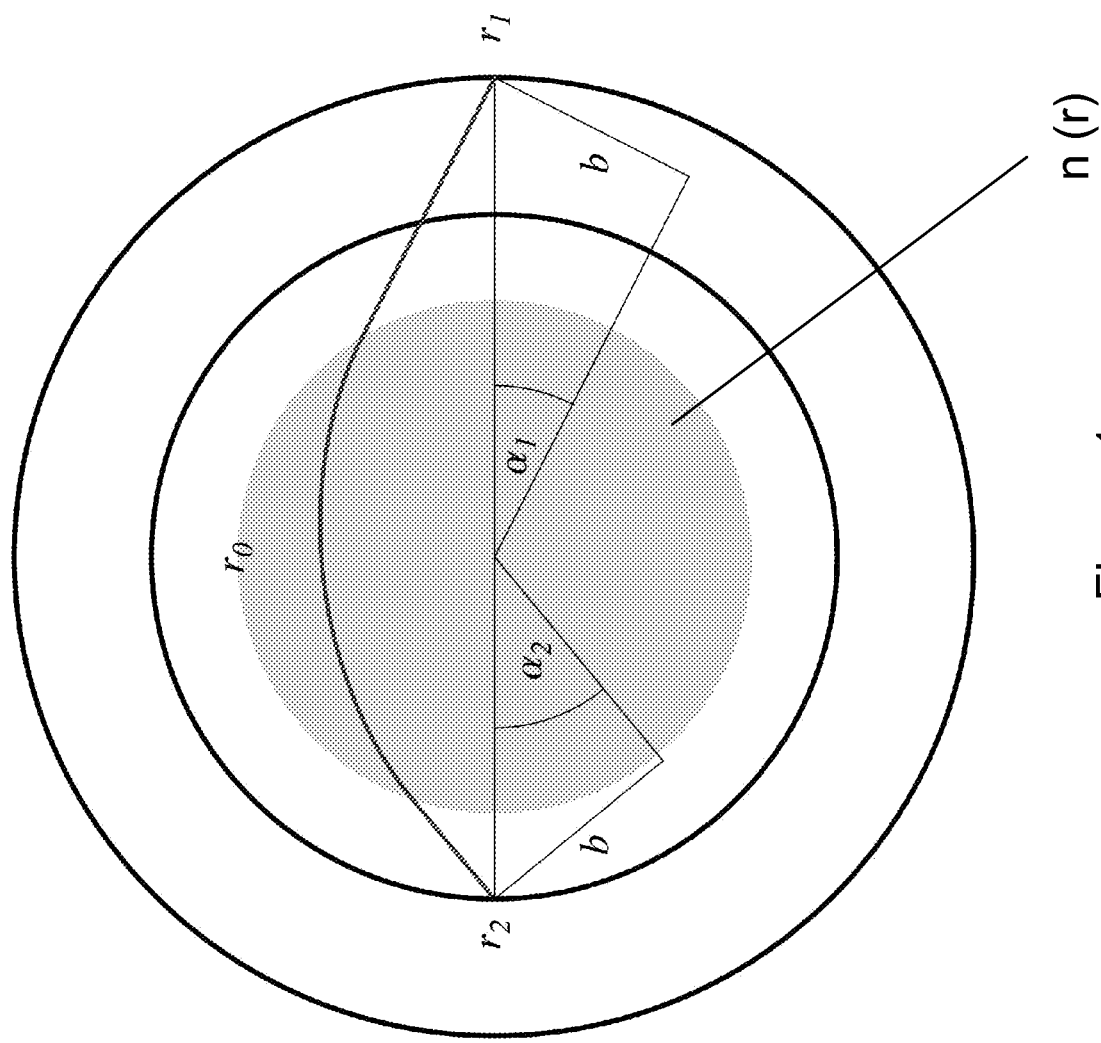
FIG. 1 illustrates Luneburg's generalised focussing profile. The refractive index profile or radius $r_0$ (gray) is designed such that any light ray travels from a point at radius $r_1$ to the opposite point at radius $r_2$, regardless of the impact parameter b, as long as the ray hits the profile. The total scattering angle is the sum of the angles $a_1$ and $a_2$, apart from an overall minus sign.

To explain how a perfect imaging device can be created, we start by considering a radially symmetric index profile $n(r)$ which extends to the radius $r_0$ (see FIG. 1). The index profile may be implemented by, for example, a lens. To create a perfect imaging device, we require that all rays emitted from a point at radius $r_1$ (with $r_1 > r_0$ in this case) are focused at an opposite point at radius $r_2$ (with $r_2 > r_0$ as well in this case) as long as they hit the index profile $n(r)$. Consider a ray with impact parameter b. The scattering angle between the two points is $$\chi = -\alpha_1 - \alpha_2, \sin\alpha_i = \frac{b}{r_i}, \quad (I)$$

as long as $b \leq r_0$; otherwise the scattering angle is zero, because the ray misses the focussing index profile $n(r)$. One exemplary profile that does this is given in implicit form by the generalised Luneburg profile [2]:

$$n(\rho) = \exp\left(-\frac{1}{\pi}\int_\rho^{r_0} \frac{\chi\,db}{\sqrt{b^2-\rho^2}}\right) \quad (II)$$

Formula (II) is implicit, because n is not directly expressed as a function of the radius, but in terms of the turning parameter p that, in turn, is related to the radius by $$\rho = nr \quad (III)$$

In order to see how this theory works, have a look at two well-known examples.

EXAMPLES

Luneburg Lens

Figure 2:
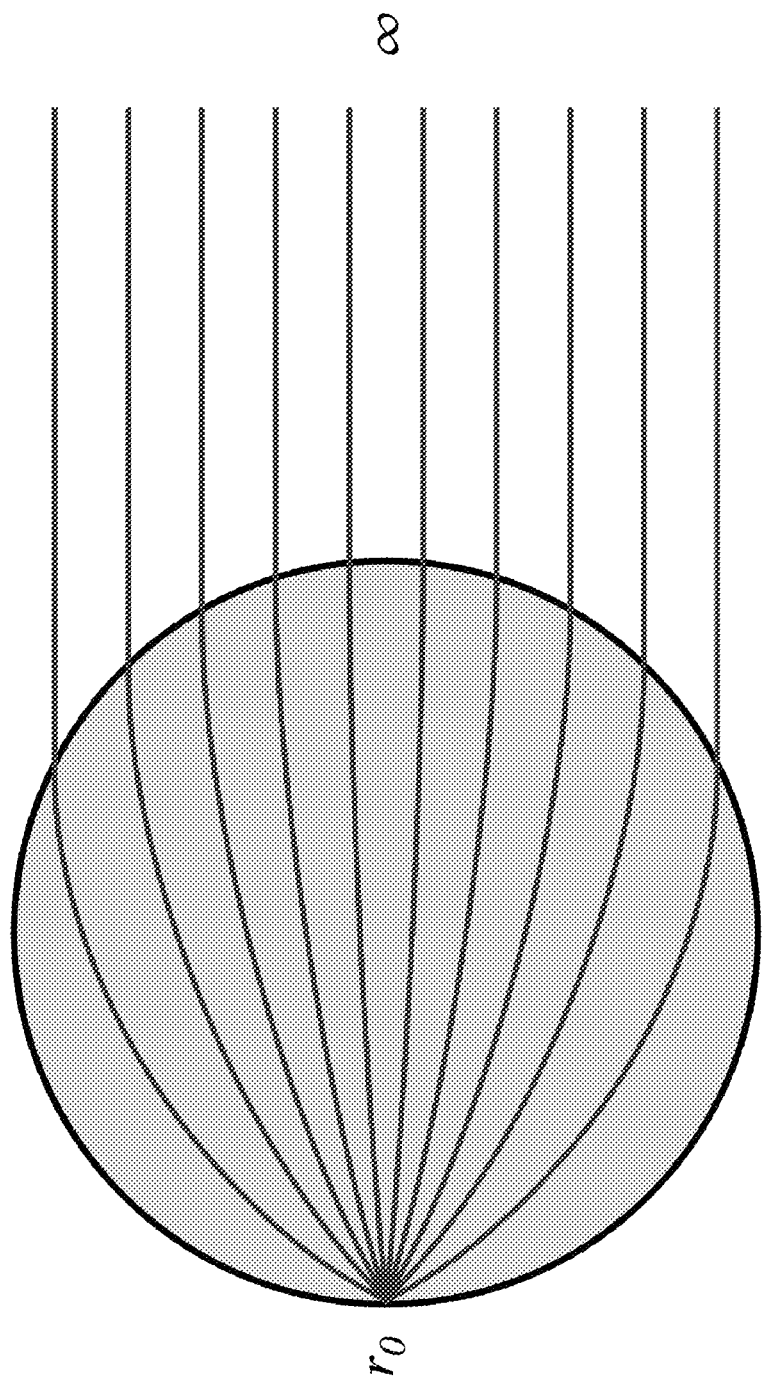
FIG. 2 is a schematic ray diagram of a Luneburg lens.

The first example provided is the Luneburg lens (shown in FIG. 2), which focuses light coming from ∞ in a point at the surface of the index profile. That is:

$$r_1 = \infty, \ r_2 = r_0 \quad (IV)$$

In this case, $\alpha_1 = 0$ and $\alpha_2 = \arcsin(b/r_0)$. We use the integral $$\int_0^{r_0} \frac{\arcsin(b/r_0)}{\sqrt{b^2-\rho^2}} db = \frac{\pi}{2}\ln\left(1 + \sqrt{1-(\rho/r_0)^2}\right) \quad (V)$$

and we obtain from the reconstruction formula (II):

$$n(\rho) = \sqrt{1 + \sqrt{1-(\rho/r_0)^2}} \quad (VI)$$

We substitute this result in relation (III) of the turning parameter and solve the resulting equation for ρ, which gives $$\rho = r\sqrt{2-(r/r_0)^2} \quad (VII)$$

and, according to relation (III), $$n = \sqrt{2-(r/r_0)^2} \quad (VIII)$$

This is the index profile of the Luneburg lens, a device used in radar technology. From a theoretical perspective, the Luneburg lens implements a harmonic-oscillator potential in optics [3].

Maxwell's Fish-Eye

The second example is Maxwell's Fish-eye lens, which is a special case of Luneburg's general focusing profile. In this case, $$r_1 = r_0, \ r_2 = r_0. \quad (IX)$$

In addition, $\alpha_1 = \alpha_2 = \arcsin(b/r_0)$.

We obtain from the reconstruction formula (II) and the integral (V) the index profile in terms of the turning parameter, $$n(\rho) = 1 + \sqrt{1-(\rho/r_0)^2} \quad (X)$$

which gives, according to relation (III), $$n = \frac{2}{1+(r/r_0)^2} \quad (XI)$$

This is the refractive index profile of Maxwell's fish-eye. Luneburg [1] noticed that this profile implements the geometry of the sphere by stereographic projection.

As explained in subsequent sections, it is considered extremely difficult (if not impossible) to make Maxwell's fish-eye in practice. For this reason, Maxwell's fish-eye has never been practically realised. However, as will be explained in more detail in Section 2, the inventors have found a way of putting Maxwell's fish-eye (and in fact the generalised Luneburg profile) into practice. In short, as indicated above, to implement Maxwell's fish-eye, a reflector is provided around the lens at $r_1=r_2=r_0$ (or at $r_1(=r_2)>r_0$ to implement the generalised Luneburg profile). The reasons for introducing the reflector are explained more fully in Section 2 but the implementation of a general Luneburg profile in combination with such a reflector is described as follows.

Modified Fish-Eye Mirrors

The term 'modified fish-eye mirror' is used here to mean an imaging device comprising: a lens with a predetermined refractive index profile which varies in accordance with a generalised Luneburg profile; and a reflector provided around the lens. It will be understood that this is only an embodiment of the disclosure, and it is not necessary for the lens to have a generalised Luneburg profile; any other suitable refractive index profile may be used.

Two modified circular (when viewed in plan—see FIGS. 3A and 3B) fish-eye mirrors 10, 20 are shown in FIGS. 3A and 3B respectively. Each fish-eye mirror 10, 20 comprises a lens 12, 22 having a refractive index that varies according to a predetermined refractive index profile which in this case conforms to the generalised Luneburg profile (see below). A source 16, 26 is provided in each case for transmitting waves (typically electromagnetic waves or sound waves) in the device and an outlet 18, 28 for decoupling waves from the device is also provided. In addition (as described above), each fish-eye mirror 10, 20 comprises a reflector 14, 24 provided around the lens 12, 22, the source 16, 26 and the outlet 18, 28 (in this case, the lens, outlet and source reside on the same plane and the reflector surrounds the lens, source and reflector in two dimensions on said plane).

The source 16, 26 may be a means for coupling radiation into the device, such as a reflecting or scattering means (such as an object to be imaged). Alternatively, the source may be a radiation source such as a laser diode. It is preferable that the outlet is positioned on an external surface of the lens, as this will facilitate more efficient image transfer. The 'outlet' is typically an absorptive element such as a layer of photo-resistive or photographic material, a photodiode, or a CCD or CMOS pixel array but could also be a light collector such as an optical fibre or a reflective element such as a mirror as long as it fulfils its function of decoupling radiation from the device. Typically more than one outlet is provided.

In both cases 10, 20, the two radii $r_1$ and $r_2$ are the same, $$r_1=r_2 \quad (XII)$$

and the lenses 12, 22 are surrounded in two dimensions by a reflector at the focusing radius $r_1$. It is also noted that $r_1(=r_2)>r_0$ in this embodiment.

Although in this case the lens conforms to a generalised Luneburg profile (where $r_1=r_2$, and $r_1>r_0$), the lens may alternatively conform to the refractive index profile of Maxwell's fish eye (where $r_1=r_2=r_0$). In another alternative embodiment, the lens may conform to any other refractive index profile as long as the reflector and the refractive index profile of the lens are arranged to direct waves emitted in any of a plurality (not necessarily all) of directions from the source 26 to the outlet 28 (although this is not the case with the first mirror 10 as explained below).

In the second modified fish-eye mirror 20, the source 26 and the outlet 28 are positioned inside the lens 22 (i.e. inside the radius $r_0$). However, in the first modified fish-eye mirror 10, the source 26 and the outlet 28 are positioned outside the lens 12 (i.e. outside the radius $r_0$) but still within the boundary of the reflector 14 at $r_1$.

In the second modified fish-eye mirror 20, the lens 22 and reflector 24 are together arranged to direct waves emitted in any of a plurality of (possibly, but not necessarily, all) directions from the source 26 to the outlet 28. That is, waves coming from any point P on the reflector is focused on the other side and reflected, whereupon it goes through the focusing medium once more and returns to P. Consequently, light rays form closed loops, as they strike the focusing index profile of the lens. Waves (such as light rays) emitted from a point r in this profile always propagate along closed trajectories (that is, in the absence of the outlet, the waves would be directed back to the source). The radial symmetry of the device implies that all these rays must also go through −r. In other words, a source at r is perfectly imaged at −r ('−r' representing the diametrically opposite point 28 on the lens from the source 26 at r in the case of the second fish-eye mirror 20).

In the case shown in FIG. 3B, regardless of the direction in which waves are emitted from the source 26, they will be focussed on the outlet 28. That waves emitted in any of a plurality of (possibly, but not necessarily, all) directions from the source 26 are directed to the outlet 28 allows perfect imaging to be achieved. That is, the spot-size of the focussed waves on the outlet can be infinitesimally small—its minimum size is not restricted to the diffraction limit.

In the first modified fish-eye mirror 10, the point at which waves transmitted from the source are focussed is dependent on the direction in which the waves are transmitted. Thus, not all ray trajectories are closed and the image probably is not perfect. This is illustrated in FIG. 3A by the fact that rays emitted from the source 16 are not perfectly focused on the point 18 diametrically opposite the source. Rather, the image is imperfect. However, perfect imaging could be achieved either by amending the refractive index profile or the reflector (or alternatively the source 16, 26 and outlet 18, 28 may be located inside the lens 12 as per FIG. 3B).

Note that it is not considered essential for perfect imaging that the waves follow a closed trajectory. However, in the case of a Maxwell fish-eye mirror, all ray trajectories are closed, because $r_1=r_0$. In the case of the generalised Luneburg profile shown in FIG. 3B, all ray trajectories are closed because the source and outlet are inside the lens.

In the embodiments shown in FIGS. 3A and 3B, the reflector is substantially annular and the lens is positioned in the annulus of the reflector. Preferably, the lens and reflector are concentric.

It is noted that the lens 22 and reflector 24 of the device 20 are arranged with a gap 29 between them (as $r_1>r_0$). Referring back to FIG. 1, a lens with a generalised Luneburg profile requires light leaving the reflector at radius $r_1$ to be focussed at an opposite point $-r_1$ on the reflector. For a Maxwell fish-eye lens, where $r_1=r_2=r_0$, the lens is required to bend light significantly from one side of the lens to the other (the reflector being immediately adjacent the lens as the reflector and lens have substantially identical radii—see FIG. 8B). However, when the generalised Luneburg profile is employed and $r_1(=r_2)>r_0$, some rays do not strike the lens due to the gap 29 between lens 22 and reflector 24. Thus, waves reflected by the reflector 24 enter the lens 22 at less steep angles compared to Maxwell's fish-eye. As a result, the refractive power of the lens does not need to be as high. This allows the ratio of the maximum to minimum refractive index of the lens to be decreased.

Figure 5:
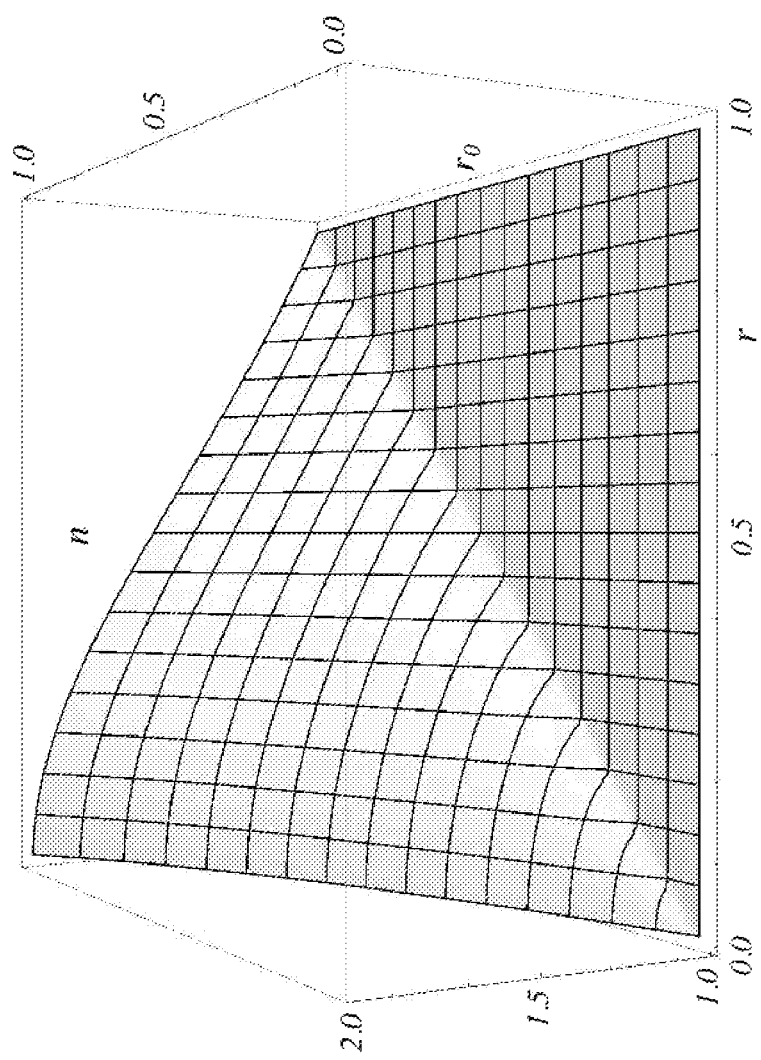
FIG. 5 is a plot of refractive index profiles n(r) for focusing media with radii $r_0$ in units of $r_1$.

This is illustrated in FIG. 5 which shows the index profile n(r) for focusing media with radii $r_0$ in units of $r_1$. This shows that n peaks at 2 where r is 0 (i.e. the centre of the lens) and decreases to 1 where r=1 (i.e. on the edge of the lens) when $r_0=1$ (i.e. in the case of Maxwell's fish eye). However, if $r_1>r_0$ (the generalised Luneburg profile), which is represented in FIG. 5 by $r_0<1$, the ratio of the required refractive index at the centre of the lens (r=0) compared with the required refractive index at the edge of the lens (where r=1) is lower.

Using modified fish-eye profiles (i.e. the generalised Luneburg profile) thus has the following advantage over Maxwell's fish-eye: the index contrast required for perfect focusing is less than in Maxwell's fish eye. Therefore they are easier to manufacture, for example with graded index profiles and tapered waveguides. In one embodiment of the imaging device 20, where the lens 22 conforms to the generalised Luneburg profile, the ratio of maximum to minimum refractive index of the lens is approximately 1.38. In this case, the lens is formed from a mixture of silica (refractive index 1.45) and silicon nitride (refractive index 2) and the graded refractive index profile ranges from 1.45 to 2. With current technology, a graded refractive index profile (being a continuous rather than a discretised profile) is difficult to achieve when the refractive index profile is required to range from 1 to 2. Therefore, a structured (i.e. discretised) refractive index profile would be necessary in this instance. Such a structured profile would limit the achievable image resolution (albeit it may still be possible to extend the resolution beyond the diffraction limit using this approach).

In devices 10, 20, the lenses 12, 22 are substantially planar and they lie on the same plane as the source, the outlet and the reflector. In an alternative embodiment, the lenses and reflectors may be three dimensional.

What does it take to make a modified fish-eye mirror? We obtain from the reconstruction formula (II) and relation (III)

$$r(\rho) = \rho \exp\left(-\frac{2}{\pi}\int_{\rho}^{r_0} \frac{\arcsin(b/r_1)}{\sqrt{b^2 - \rho^2}} db\right) \quad \text{(XIII)}$$

The radius is a monotonically increasing function of the turning parameter $\rho$ (seen by differentiation) and r≤$\rho$. Consequently, $\rho$ is a single-valued function of r, and the index profile is physically allowed. The function $\rho(r)$ must be monotonically increasing as well. Furthermore, the function $n(\rho)$ is monotonically decreasing in $\rho$ (seen by differentiation again) and, consequently, n is monotonically decreasing in r: the highest index value is the value at the origin with [4]

$$n_0 = \exp\left(\frac{2}{\pi}\int_0^{r_0} \arcsin(b/r_1)\frac{db}{b}\right) = \exp\left(\frac{2}{\pi}\int_0^{r_0/r_1} \arcsin\xi \frac{d\xi}{\xi}\right) \quad \text{(XIV)}$$

With the help of this formula one can quickly calculate the required index range for the modified fish-eye mirror. Given the radii $r_0$ and $r_1$, the index profile itself is most easily calculated by storing a table of (r, $\rho$) values where $\rho$ ranges from 0 to $r_0$ and r is numerically calculated according to formula (XIII). Then an interpolating function $\rho(r)$ is constructed from the calculated data and the index profile is computed as:

$$n = \frac{\rho(r)}{r} \text{ for } 0 \le r \le r_0 \text{ and } n = 1 \text{ for } r > r_0 \quad \text{(XV)}$$

Figure 4:
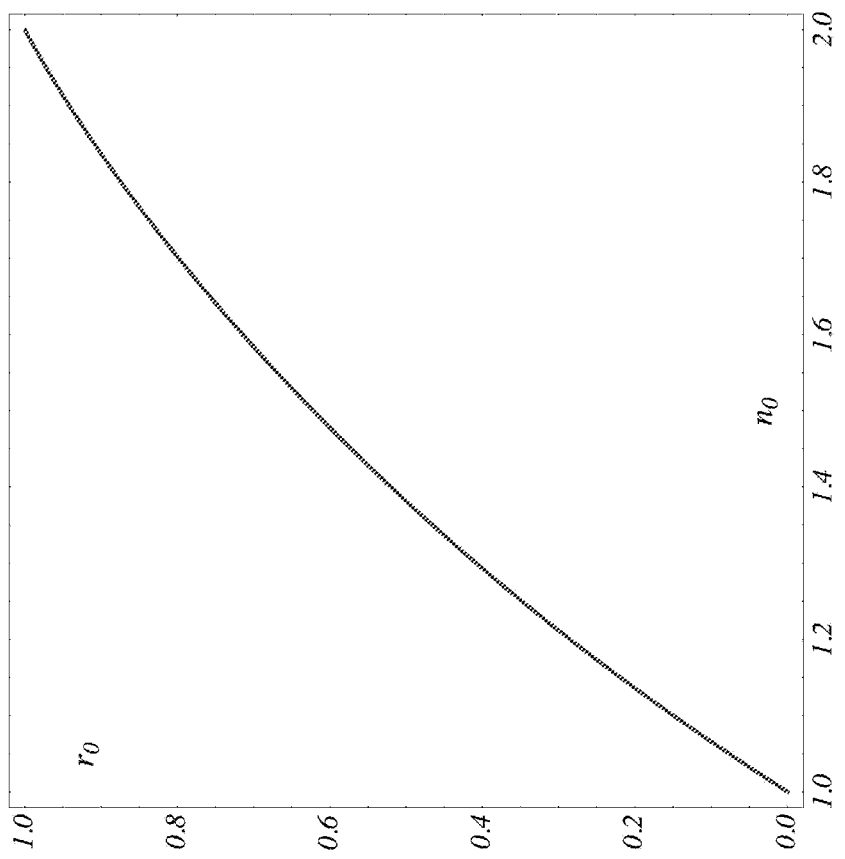
FIG. 4 is a plot of the index range $n_0$ required for a lens (focusing medium) with radius $r_0$ in units of $r_1$.

A plot of focusing medium radius $r_0$ (in units of $r_1$) versus the highest index value $n_0$ is shown in FIG. 4. As $n_0$ increases, $r_0$ increases (although as shown in FIG. 4 there is a slight non-linearity in the relationship).

So far, our theory only shows that light rays from perfect images, but, as shown below, waves may surprisingly be perfectly focused, too.

Section 2: Proof that Image-Resolution of Maxwell's Fish Eye is not Limited by Wave Nature of Light Here we establish a mathematical proof that the archetype of the perfect optical instrument, Maxwell's fish eye [6], is perfect by all standards: it has unlimited resolution in principle. Computer simulations show that unlimited resolution is also achievable using the generalised Luneburg profile. Also, although this proof refers to 'light', it is applicable to all other types of waves such as electromagnetic waves of all kinds and sound waves.

We also show how to modify the fish eye for turning it into a perfect imaging device that can be made in practice, with the fabrication techniques that were applied for the implementation [11]-[13] of optical conformal mapping [14]-[17]. Such devices may find applications in broadband far-field imaging with a resolution that is only limited by the substructure of the material, but no longer by the wave nature of light.

Given the phenomenal interest in imaging with negative refraction, it seems astonishing how little attention was paid to investigating the previously known theoretical proposals for perfect optical instruments which do not require negative refraction (albeit they were not considered possible in practice), in particular as they are described in *Principles of Optics* by Born and Wolf [10]. The most famous perfect optical instrument, Maxwell's fish eye [6], was treated with Maxwell's equations [18, 19] but without focusing on its imaging properties, and the same applies to the fish eye for scalar waves [20] and numerical simulations of wave propagation in truncated fish eyes [21]. Here we analyse wave-optical imaging in a two-dimensional (2D) Maxwell fish eye, primarily because such a device can be made in integrated optics on a silicon chip for infrared light [11, 12] or possibly with gallium nitride or diamond integrated optics for visible light. We begin our analysis with a visual exposition of the main ideas and arguments before we apply analytical mathematics to prove our results.

Maxwell [6] invented a refractive-index profile where all light rays are circles and, according to his paper, 'all the rays proceeding from any point in the medium will meet accurately in another point'. As Maxwell wrote, 'the possibility of the existence of a medium of this kind possessing remarkable optical properties, was suggested by the contemplation of the crystalline lens in fish'—hence fish eye— 'and the method of searching for these properties was deduced by analogy from Newton's *Principia*, Lib. I. Prop. VII'. Luneburg [9] represented Maxwell's fish-eye profile in a beautiful geometrical form: the fish eye performs the stereographic projection of the surface of a sphere to the plane (or the 3D surface of a 4D hypersphere to 3D space). As the surface of a sphere is a curved space—with constant curvature—the fish eye performs, for light, a transformation from a virtual curved space into physical space [22]; it is the simplest element of non-Euclidean transformations optics [23], suggested for achieving broadband invisibility [23, 24].

Figure 6:
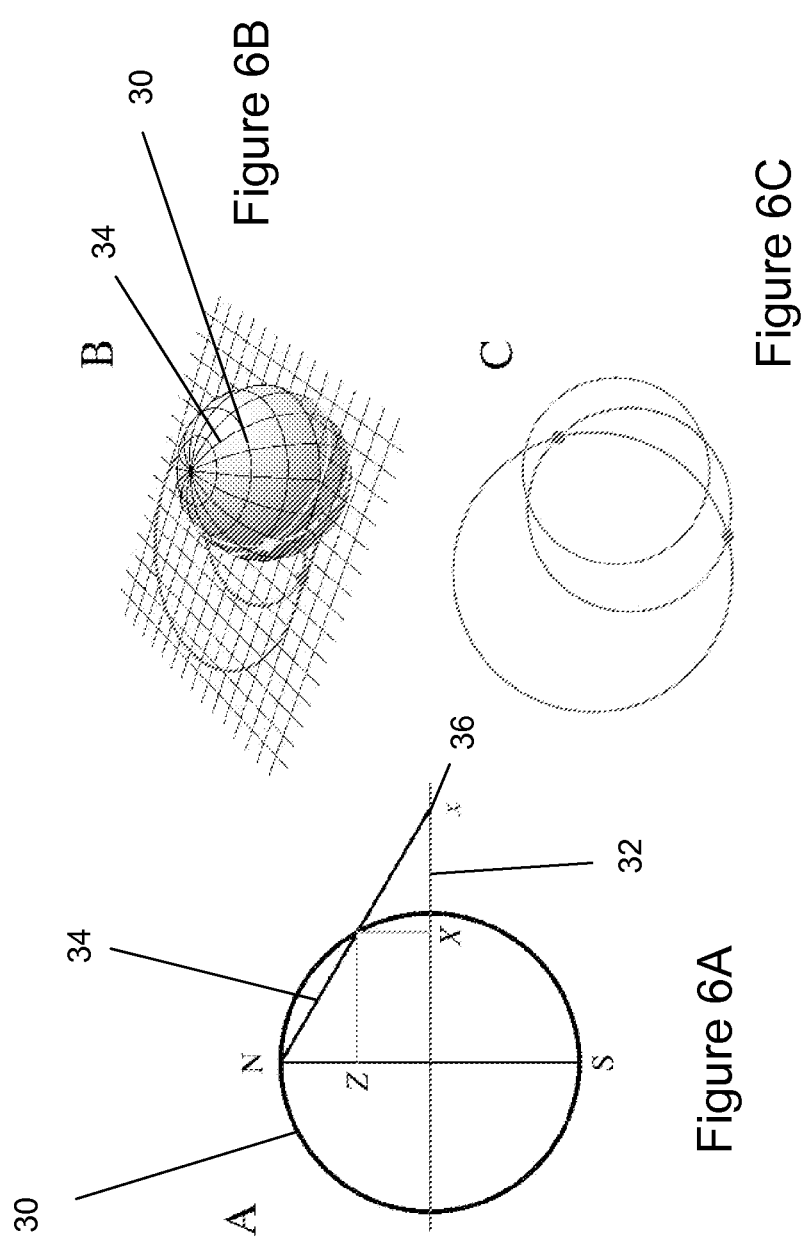
FIGS. 6A-6C illustrate the stereographic projection of a sphere to a plane.

The stereographic projection, invented by Ptolemy, lies at the heart of the Mercator projection [25] used in cartography. FIG. 6 shows how the points on the surface of the sphere 30 are projected to the plane 32 cut through the Equator. Through each point, a line 34 is drawn from the North Pole that intersects this plane 32 at one point, the projected point 36. In this way, the surface of the sphere 30 is mapped to the plane 32 and vice versa; both are equivalent representations. In the following we freely and frequently switch between the two pictures, the sphere 30 and the plane 32, to simplify arguments.

Imagine light rays on the surface of the sphere 30. They propagate along the geodesics, the great circles. Consider a bundle of light rays emitted at one point. All the great circles departing at this point must meet again at the antipodal point on the sphere 30, see FIG. 6(B). The stereographic projection maps circles on the sphere to circles on the plane 32 [25]. Consequently, in an optical implementation of the stereographic projection [9]—in Maxwell's fish eye [6]—all light rays are circles and all rays from one point meet at the projection of the antipodal point, creating a perfect image.

Figure 7:
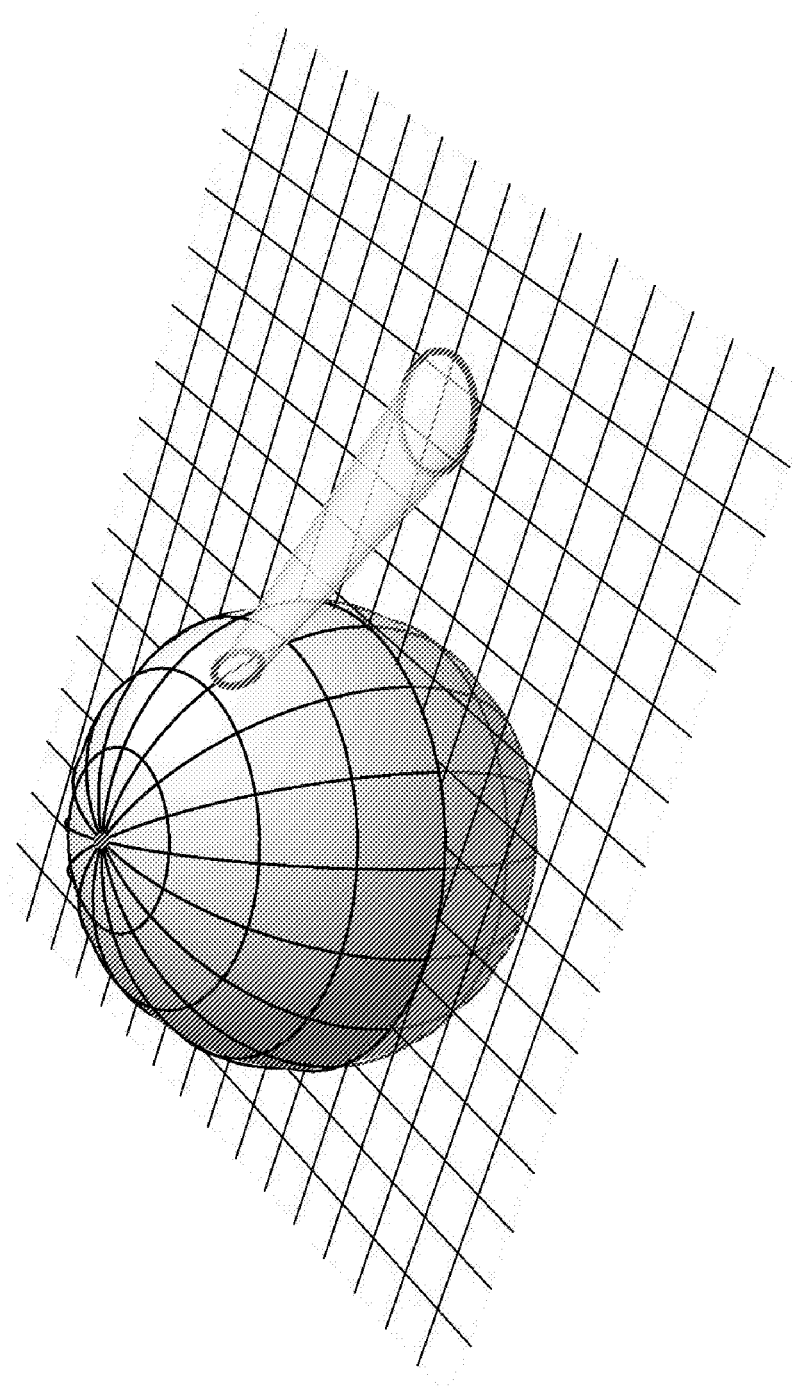
FIG. 7 visualizes the refractive index profile needed to implement the stereographic projection. It shows that an isotropic medium is sufficient. To implement the stereographic projection, the refractive index of the optical medium must be given by the ratio between a line element on the sphere and the corresponding projected line element on the plane. As the stereographic projection maps circles into circles, this ratio cannot depend on the direction of the line element: the medium is isotropic (the stereographic projection is a conformal map).

If one wishes to implement the stereographic projection, creating the illusion that light propagates on the surface of a sphere, one needs to make a refractive-index profile n in physical space that matches the geometry of the spherical surface with uniform index $n_1$. The refractive index n is the ratio between a line element in virtual space and the corresponding line element in physical space [23]. In general, this ratio depends on the direction of the line element and so the geometry-implementing material is optically anisotropic. However, as the stereographic projection transforms circles into circles, even infinitesimal ones, the ratio of the line elements cannot depend on direction: the medium is optically isotropic, see FIG. 7. From this figure, we can read off the essential behaviour of the required index profile n. At the Equator, n is equal to the index $n_1$ of the sphere 30. At the projection of the South Pole, the origin of the plane, n must be $2n_1$. We also see that n tends to zero near the projection of the North Pole, infinity. Maxwell's exact expression for the fish-eye profile [6] that performs the stereographic projection [9] interpolates through these values:

$$n = \frac{2n_1}{1+r^2} \qquad (1)$$

Here r denotes the distance from the origin of the plane 32 measured in terms of the size of the device. In these dimensions, the Equator lies at the unit circle. Beyond the Equator, in the projected region of the Northern Hemisphere with r>1, the index falls below $n_1$ and eventually below 1; the speed of light in the material must exceed the speed of light in vacuum.

Figures 8A, 8B:
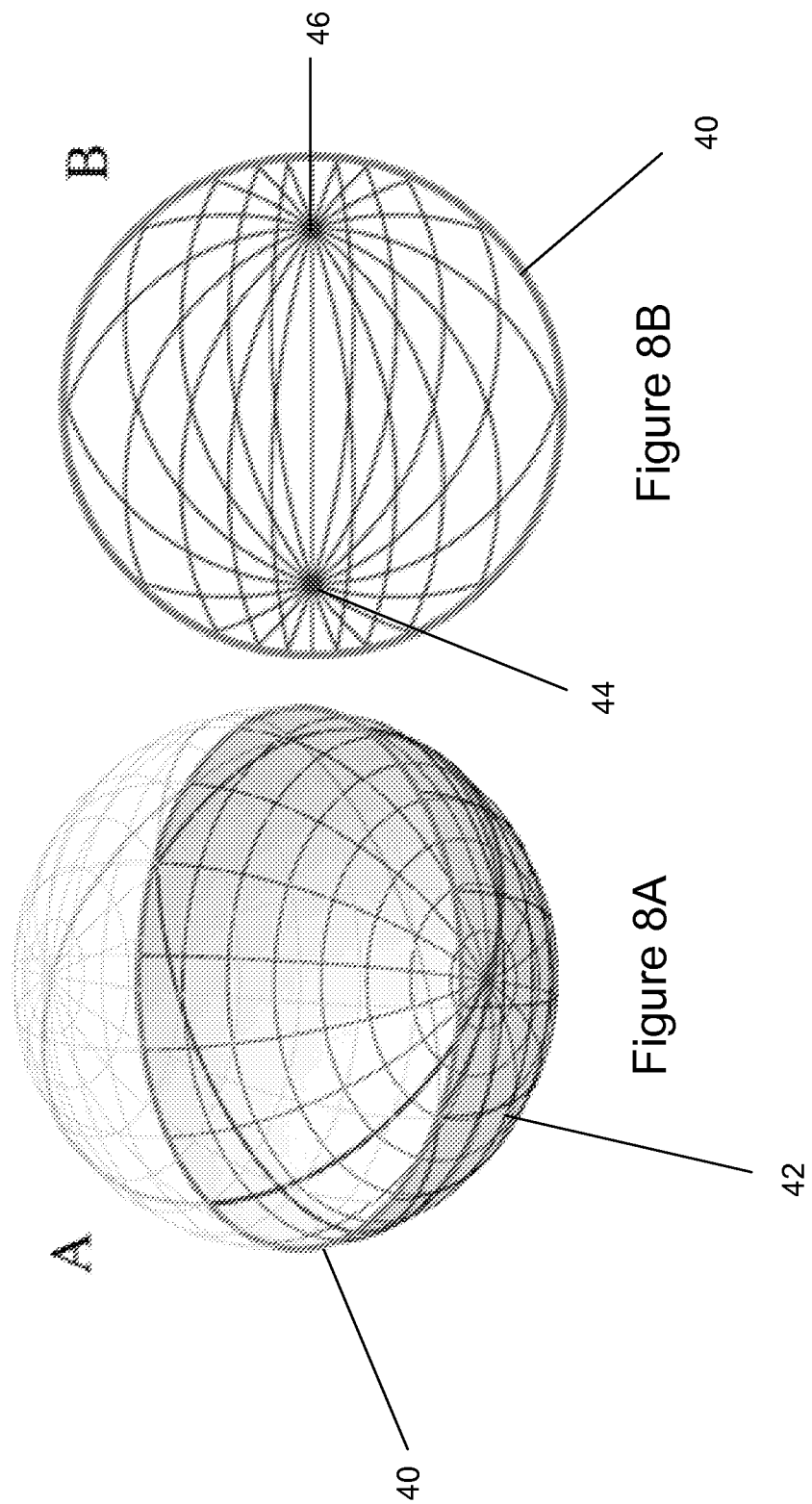
FIGS. 8A and B illustrate a fish-eye mirror comprising a lens with a refractive index conforming to Maxwell's fish eye profile ($r_1=r_2=r_0$) and a reflector provided around the lens.
FIG. 8B, shows waves emitted from one point on the plane in the stereographic projection performed by Maxwell's fish eye. The reflected rays from an arbitrary point (the source) all meet at the corresponding image point (the outlet).

In order to avoid the apparent need for superluminal propagation, we adopt an idea from non-Euclidean cloaking [23]: we place a reflector 40 (mirror) around the Equator, see FIG. 8(A). For light propagating on the Southern Hemisphere 42, the mirror creates the illusion that the rays are doing their turns on the Northern Hemisphere, whereas in reality they are reflected. Light emitted at the Equator is focused on the opposite of the Equator. FIG. 8(B) (which is similar to FIG. 3B but $r_1=r_2=r_0$) shows that the reflected image of the antipodal point 44 is the mirror image of the source 46 in the plane (an inversion at the centre). Each point within the reflector-enclosed circle creates a perfect image. In contrast, an elliptical mirror has only two focal points, instead of focal regions, and is therefore less suitable for imaging.

Figures 9A, 9B:
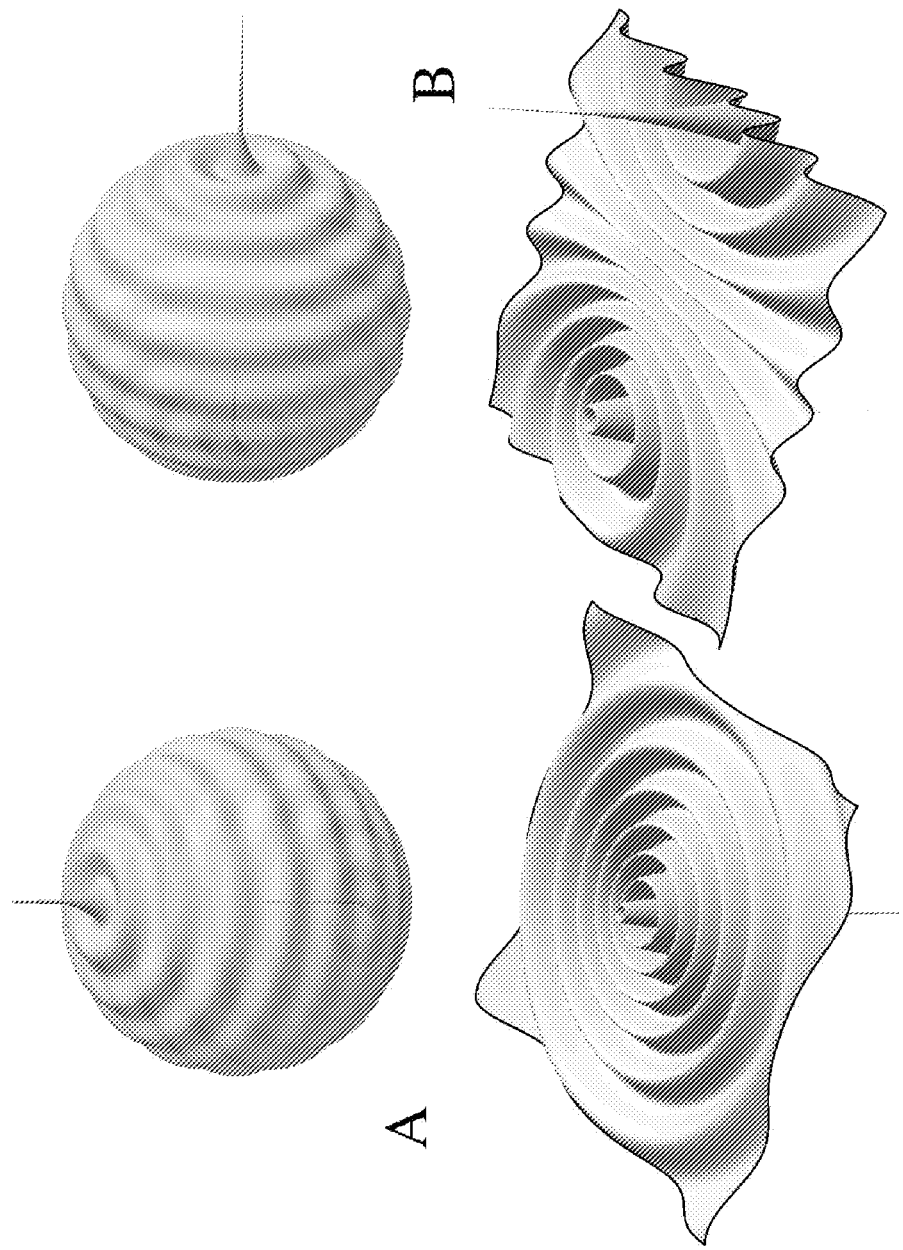
FIG. 9A illustrates the Green's function. The wave emitted by a source at the South Pole is visualized on the sphere and projected to the plane. The pictures show the real part of the electric field (12) with $v=20.25$; for the visualization on the sphere the radius is modulated as $1+0.5$ Re$E_v$. At the North Pole the field focuses to a point.
FIG. 9B is similar to FIG. 9A but the field shown in (A) is rotated on the sphere and then projected in order to establish the wave emitted at an arbitrary source point. On the plane, the rotation corresponds to the rotational Möbius transformation (20) with angles γ and χ. The rotation angle of the sphere is 2γ (with $\gamma=-0.2\pi$ here).

The required refractive-index profile (1) for r≤1 can be manufactured on planar chips, for example by diluting silicon with air holes [11] or by enhancing the index of silica with pillars of silicon [12]. The index contrast n(0)/n(1) of 2 is achievable for infrared light around 1500 nm. Gallium-nitride or diamond integrated optics could be used to create suitable structures for visible light with about 500 nm wavelength. Such devices may be employed for transferring images from a nano-stamp or in other applications, provided the image resolution is significantly better than the wavelength. In the following, we show that this is indeed the case It is sufficient to establish the electromagnetic field of a point source with unit strength, the Green's function, because any other source can be considered as a continuous collection of point sources with varying densities; the generated field is a superposition of the Green's functions at the various points. First, we deduce the Green's function for the most convenient source point, the origin, the stereographic projection of the South Pole. We expect from the symmetry of the sphere that the electromagnetic wave focuses at the North Pole as if it were the source at the South Pole in reverse, and this is what we prove in the next section. The field at the South Pole thus is a perfect image of the source field at the North Pole. FIG. 9(A) illustrates this Green's function. Then we take advantage of the rotational symmetry of the sphere and rotate the point source with its associated electromagnetic field on the sphere, see FIG. 9(B). The stereographic projection to the plane gives the desired Green's function for an arbitrary source point. As the field is simply rotated on the sphere, we expect perfect imaging regardless of the source, which we prove in the next section as well.

Figure 10:
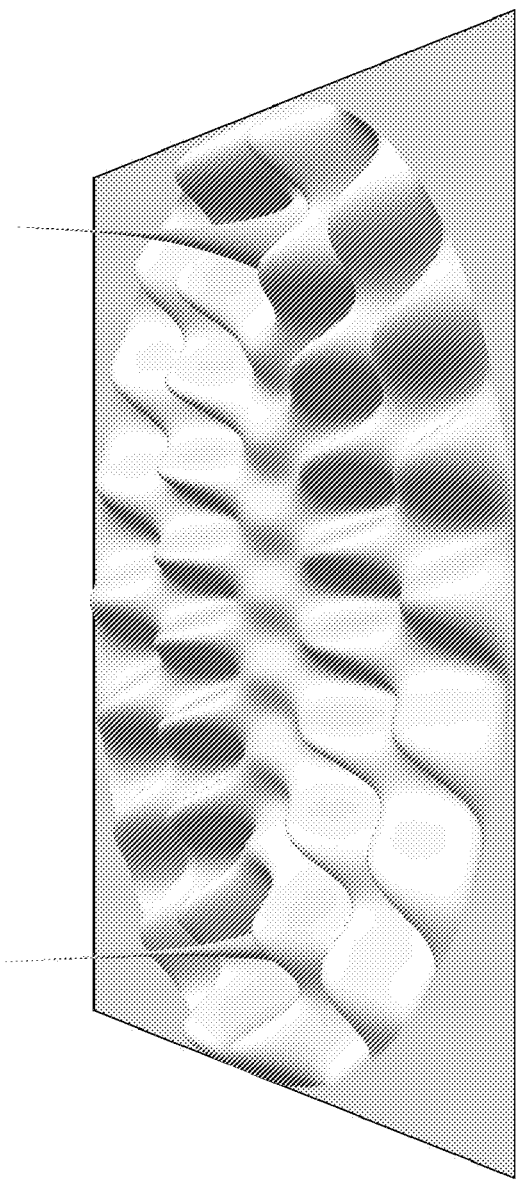
FIG. 10 illustrates imaging in the fish-eye mirror. The infinitely sharp field emitted at the source point (left tip) propagates as an electromagnetic wave until it focuses at the image point (right tip) with infinite resolution. The focusing is done by Maxwell's fish eye constrained by the reflector as shown in FIG. 8. For better visibility, the figure shows $-$Re$E_k$, given by equation (32) with the parameters of FIG. 9. The image carries the phase shift vu and has the opposite sign of the image in the fish eye without the reflector.

Finally, we include the reflection at the mirror, essentially by applying an adaptation of the method of images in electrostatics [26]. FIG. 10 shows the result: Maxwell's fish eye, constrained by a mirror, makes a perfect lens—that is, the imaged spot size can be made infinitesimally small in theory.

Calculations

In this section, we substantiate our visual arguments by analytical mathematics. It is convenient to use complex numbers z=x+iy for representing the Cartesian coordinates x and y of the plane 32. In the stereographic projection [25], the points {X,Y,Z} on the surface of the unit sphere are mapped into $$z = \frac{X+iY}{1-Z} \qquad (2)$$

or, in spherical coordinates θ and φ on the sphere, $$z = e^{i\phi}\cot\left(\frac{\theta}{2}\right) \qquad (3)$$

We obtain for Maxwell's index profile (1) with r=|z| the formula $$n = 2n_1 \sin^2\left(\frac{\theta}{2}\right) \qquad (4)$$

We express the line elements dx and dy in terms of the spherical coordinates and find $$n^2(dx^2+dy^2) = n_1^2 + \sin^2\theta d\phi^2) \qquad (5)$$

The line element on the sphere thus differs from the Cartesian line element in the plane by the ratio $n/n_1$, a conformal factor that modifies the measure of length, but not the measure of angle: the stereographic projection is a conformal map [25]. The optical medium (1) that implements this map is isotropic. Equation (5) proves [9] that Maxwell's fish eye (1) indeed performs the stereographic projection (2).

Consider TE-polarized light [27] where the electric-field vector E points orthogonal to the plane (in practice, when considering a 2D lens according to the Maxwell fish eye profile, E is orthogonal to the plane of the lens). In this case, only one vector component E matters, the orthogonal component. By Fourier analysis, we expand E in terms of monochromatic fields $E_k$. They obey the Helmholtz equation [10, 27]

$$(\nabla^2 + n^2 k^2) E_k = 0 \quad (6)$$

except at the source and image points. Close to the source point, $E_k$ should approach the logarithmic field of a line source [26]. We also require that the field E be retarded, i.e. in the time domain $$E(z,t) = \int_{-\infty}^{+\infty} E_k e^{-ikt} dk = 0, \text{ for } t < 0, \quad (7)$$

where t denotes time in appropriate units (of propagation length measured in terms of the dimensions of the device). For simplicity, we rescale the wavenumber k such that $$n_1 = 1 \quad (8)$$

If we manage to show that the field $E_k$ is also logarithmic near the image point, as if the image were a line source run in reverse, an infinitely-well localized drain (that is, an outlet which decoupled light from the device), we have proven perfect imaging with unlimited resolution. We need to supplement the optical medium with a drain (or 'outlet'—drain and outlet will be used interchangeably) as well as a source, for the following reason. In writing down the Helmholtz equation (6), we consider monochromatic waves in a stationary state. However, the source is continuously generating a stream of electromagnetic waves that must disappear somewhere. In free space, the waves would disappear in the infinitely far distance, at infinity. In the case of imaging, the waves must find a finite drain, for otherwise a stationary state cannot exist. We must assume that the waves are absorbed at the image (by the outlet). However, source and drain ought to be causally connected as well; in our model we cannot simply place an arbitrary inverse source at the expected image point. The field at the drain must exhibit a phase shift due to the time delay between source and image, and the Green's function must be retarded according to equation (7). Causality and infinite resolution are both required for proving perfect imaging.

Consider the case of the most convenient source point, illustrated in FIG. 9(A). Here the source is placed at the origin, the stereographic projection of the South Pole. As it is natural to assume radial symmetry, the Helmholtz equation (6) is reduced to $$\frac{1}{r} \frac{\partial}{\partial r} r \frac{\partial E_k}{\partial r} + n^2 k^2 E_k = 0 \quad (9)$$

in polar coordinates with r=|z|. The general solution of this ordinary differential equation is a superposition of Legendre functions [28] $P_\nu(\pm\zeta)$ with the index $$\nu = \frac{1}{2}(\sqrt{4k^2+1} - 1) \text{ or, equivalently, } k^2 = \nu(\nu+1) \quad (10)$$

and the variable $$\zeta = \cos\theta = \frac{r^2-1}{r^2+1} \quad (11)$$

The relation between k and ν is the same as between the wavenumber and index of a spherical harmonic, but ν is not necessarily an integer. Let us write down the specific solution:

$$E_\nu = \frac{P_\nu(\zeta) - e^{i\nu\pi} P_\nu(-\zeta)}{4\sin(\nu\pi)} \quad (12)$$

that can also be expressed in terms of the Legendre function $Q_\nu$ of the second kind [28], $$E_\nu = \frac{e^{i\nu\pi}}{2\pi} Q_\nu(\zeta) \quad (13)$$

Note that the definition of $Q_\nu$ is sometimes ambiguous—it depends on the branch chosen on the complex plane—and so we generally prefer the expression (12) here. Note also that this expression has a meaningful limit for integer ν when both the denominator and the numerator tend to zero [28]. We obtain from equations 3.9.(9) and 3.9.(15) of [28] the asymptotics $$E_\nu \sim \frac{\ln r}{2\pi}, \text{ for } r \to 0, \quad (14)$$

which proves that formula (12) describes the electromagnetic wave emitted from a line source, because for r within a small circle around the origin we obtain $$\iint (\nabla^2 + n^2 k^2) \frac{\ln r}{2\pi} dA \sim \iint \frac{\nabla^2 \ln r}{2\pi} dA = \oint \frac{\nabla \ln r}{2\pi} ds = 1, \quad (15)$$

where we used Gauss' theorem in 2D with ds pointing orthogonal to the integration contour. In order to prove that the Green's function (12) is retarded, we utilize the integral representation 3.7.(12) of [28] for $Q_\nu$ in expression (13), $$E_\nu = \frac{e^{i\nu\pi}}{2\pi} \int_0^{+\infty} \frac{d\xi}{(\cos\theta + i\cosh\xi\sin\theta)^{\nu+1}} \quad (16)$$

The Green's function thus is an integral over powers in ν. As arg(cos θ+i cos h ξ sin θ)≤π for 0≤θ≤π and ν→k for k→∞, the integrand multiplied by exp(iνπ) falls off exponentially on the upper half of the complex k plane. Therefore we can close the integration contour of the Fourier transform (7) there. As the integrand of the representation (16) multiplied by exp(iνπ) is analytic in k, the Fourier integral (7) vanishes for t<0, which proves that $E_\nu$ describes the retarded Green's function. We also obtain from equations 3.9.(9) and 3.9.(15) of [28] the asymptotics $$E_v \sim e^{iv\pi} \frac{\ln r}{2\pi}, \text{ for } r \to \infty, \quad (17)$$

which proves that the image at infinity is perfectly formed, with a phase delay of $v\pi$. Furthermore, we obtain from equation 3.9.(2) of [28] the convenient asymptotic formula $$E_v \sim e^{i(v-1/2)\pi} \frac{\Gamma(v+1)}{4\Gamma(v+3/2)} \frac{(r-i)^{v+1}(r+i)^{-v}}{\sqrt{\pi r}} \quad (18)$$

for large $v$ and $r$ located somewhere between 0 and $\infty$, an excellent approximation for the Green's function (12), except near source and image.

So far we have established the Green's function of a source at the origin. In order to deduce the Green's function of an arbitrary source point, we utilize the symmetry of the sphere in the stereographic projection illustrated in FIG. 9. We rotate the source with its associated field from the South Pole (FIG. 9(A)) to another, arbitrary point on the sphere 30 and project it to the plane 32 (FIG. 9(B)). Rotations on the sphere correspond to a subset of Möbius transformations on the complex plane [25]. A Möbius transformation is given by a bilinear complex function with constant complex coefficients, $$z' = \frac{az+b}{cz+d}, \text{ with } ad - bc = 1 \quad (19)$$

A rotation on the sphere corresponds to [25]

$$z' = \frac{z\cos\gamma - e^{i\chi}\sin\gamma}{z e^{-i\chi}\sin\gamma + \cos\gamma} \quad (20)$$

We obtain for the Laplacian in the Helmholtz equation (6)

$$\nabla^2 = 4 \frac{\partial^2}{\partial z \partial z^*} = \left|\frac{dz'}{dz}\right|^2 \quad (21)$$

$$\nabla'^2 = |cz+d|^{-4} \nabla'^2$$

From the relations $$|a|^2+|b|^2=|c|^2+|d|^2=1, \ ab^*+cd^*=0 \quad (22)$$

for rotations (20) we get the transformation of the refractive-index profile (1) in the Helmholtz equation (6)

$$|cz+d|^2 n = \frac{2n_1|cz+d_1|^2}{1+|z|^2} = \frac{2n_1|cz+d|^2}{|az+b|^2+|cz+d|^2} = \frac{2n_1}{1+|z'|^2} \quad (23)$$

Consequently, for Maxwell's fish eye, the Helmholtz equation (6) is invariant under rotational Möbius transformations, which simply reflects the rotational symmetry of the sphere in the stereographic projection. We see from the inverse Möbius transformation $$z = \frac{az'-b}{-cz'+d} \quad (24)$$

that the source point at $z'=0$ has moved to $$z_0 = -\frac{b}{d} = e^{i\chi}\tan\gamma \quad (25)$$

and that the image at $z'=\infty$ appears at $$z_\infty = -\frac{a}{c} = -e^{i\chi}\cot\gamma = -\frac{1}{z_0^*} \quad (26)$$

The electric field is given by the expression (12) with $$r=|z'| \quad (27)$$

Near the source $z_0$, where $z' \to 0$, we linearize the Möbius transformation (20) in $z-z_0$ and near the image $z_\infty$, where $z' \to \infty$, we linearize $1/z'$ in $z-z_\infty$. In the logarithmic expressions (14) and (17), the linearization prefactors just produce additional constants that do not alter the asymptotics. Consequently, $$E_v \sim \frac{\ln|z-z_0|}{2\pi}, E_v \sim -e^{iv\pi} \frac{\ln|z-z_\infty|}{2\pi} \quad (28)$$

Maxwell's fish eye creates perfect images, regardless of the source point. The minus sign in the image field indicates that the electromagnetic wave emitted at $z_0$ with unit strength focuses at $z_\infty$ as if the image were a source of precisely the opposite strength. In addition, the image carries the phase delay $v\pi$ caused by the propagation in the index profile (1) or, equivalently, on the virtual sphere. Due to the intrinsic curvature of the sphere, the delay constant (10) is not linear in the wavenumber $k$, but slightly anharmonic. As the phase delay is uniform, however, a general source distribution is not only faithfully but also coherently imaged.

Finally, we turn to the wave optics of Maxwell's fish eye confined by a circular mirror (reflector), the case illustrated in FIGS. 8 and 10. At the mirror, the electric field must vanish. Suppose we account for the effect of the mirror by the field of a virtual source, similar to the method of images in electrostatics [26]. The virtual source should have the opposite sign of the real source and, on the sphere, we expect it at the mirror image of the source above the plane through the Equator, at $\pi-\theta$. The stereographic projection (3) of the mirrored source is the inversion in the unit circle [25]

$$z' = \frac{1}{z^*} \quad (29)$$

Consider the transformation (29), not only for the source but also for the entire electric field. We obtain for the Laplacian in the Helmholtz equation (6)

$$\nabla^2 = 4\frac{\partial^2}{\partial z \partial z^*} = \left|\frac{dz'}{dz^*}\right|^2 \nabla'^2 = |z|^{-4} \nabla'^2 \quad (30)$$

and for the transformed refractive-index profile (1)

$$|z|^2 n = \frac{2n_1}{1+|z'|^2} \quad (31)$$

So the mirror image $E_v(1/z^*)$ of the field $E_v(z)$ is also a valid solution. Let us add to the field $E_v(z)$ of the original source the field $-E_v(1/z^*)$ of the virtual source conjured up by the mirror, $$E_k = E_v(z) - E_v(1/z^*) \quad (32)$$

At the unit circle $1/z^*$ is equal to z, and so the field $E_k$ vanishes here. Consequently, formula (32) satisfies the boundary condition and thus describes the correct Green's function of the fish-eye mirror. The image inside the mirror is the image of the virtual source. From the transformation (29) follows that the image point $z'_\infty$ is located at $$z_\infty' = -z_0 \quad (33)$$

We obtain from the formula (32) and the asymptotics (28) that $$E_k \sim e^{iv\pi} \frac{\ln|z - z'_\infty|}{2\pi} \quad (34)$$

The sign flip compared to equation (28) results from the $\pi$ phase shift at the mirror, but the overall phase delay remains uniform, $(v+1)\pi$. The resolution is unlimited, and so the fish-eye mirror forms perfect images by all standards. The device may even tolerate some degree of absorption in the material. For example, assume that absorption appears as an imaginary part of the refractive index that is proportional to the dielectric profile. This case is equivalent to having an imaginary part of the wavenumber k for the real refractive-index profile (1). Here we have established the Green's function for all k, including complex ones. As the asymptotics (34) is independent of k, apart from the prefactor that accounts for the loss in amplitude, such absorption does not affect the image quality.

Discussion

Maxwell's fish eye [6] makes a perfect lens; but it is a peculiar lens that contains both the source and the image (i.e. the outlet) inside the optical medium (i.e. the lens). Negatively-refracting perfect lenses [1] are 'short-sighted' optical instruments, too, where the imaging range is just twice the thickness of the lens [29], but there source and image are outside the device. Hyperlenses [30, 31] funnel light from microscopic objects out into the far field, for far-field imaging beyond the diffraction limit, but the resolution of a hyperlens is limited by its geometrical dimensions; it is not infinite, even in principle.

Fish-eye mirrors could be applied to transfer embedded images with details significantly finer than the wavelength of light over distances much larger than the wavelength, a useful feature for nanolithography. To name another example of potential applications, fish-eye mirrors could establish extremely well-defined quantum links between distant atoms or molecules embedded in the dielectric, for example colour centres in diamond [32]. Fish-eye mirrors could also find applications outside of optics, wherever waves obey the 2D Helmholtz equation (6) with a controllable wave velocity. For example, they could make ideal whispering galleries for sound waves or focus surface waves on liquids, or possibly create strongly entangled quantum waves in quantum corrals [33].

Like the negatively-refracting perfect lens [1] with electric permittivity and magnetic permeability set to −1, the fish-eye mirror does not magnify images. Note, however, that by placing the mirror at the stereographic projections of other great circles than the Equator, one could make magnifying perfect imaging devices. One can also implement, by optical conformal mapping [14], conformal transformations of fish eyes [9] that form multiple images. Thus, the lens and the reflector can be any shape. As the fish-eye mirror consists of an isotropic dielectric with a finite index contrast, it can be made with low-loss materials and operate in a broad band of the spectrum. The image resolution is unlimited in principle. In practice, for a refractive index profile achieved by a discretised structural formation, the dimensions of the sub-wavelength structures of the material may limit the resolution. If the required index profile (1) is created by doping a host dielectric (that is, by creating a graded index profile), however, it is believed that molecular resolution could be reached.

In this section, we focused on the propagation of TE-polarized light [27] in a 2D fish eye and proved perfect resolution for this case. Here the electromagnetic wave equation, the Helmholtz equation (6), is the scalar wave equation in a 2D geometry with $n^2(dx^2+dy^2)$ as the square of the line element, because the Helmholtz equation can be written as $$0 = \frac{1}{n^2}\nabla^2 E + k^2 E = \frac{1}{\sqrt{g}}\partial_A \sqrt{g}\, g^{AB}\partial_B E + k^2 E \quad (35)$$

where the indices refer to the coordinates x and y in a geometry [22] with metric tensor $g_{AB}=n^2 \mathbb{1}$, its determinant $g=n^4$ and the inverse metric tensor $g^{AB}=n^{-2}\mathbb{1}$; and where we sum over repeated indices.

Consequently, the geometry of light established by Maxwell's fish-eye is not restricted to rays, but extends to waves, which explains why waves are as perfectly imaged as rays. In contrast, perfect imaging does not occur for the TM polarization [27] where the magnetic-field vector H points orthogonal to the plane. In this case, the corresponding wave equation [27] for the magnetic field, $$\nabla \cdot \frac{1}{n^2}\nabla H + k^2 H = 0, \quad (36)$$

cannot be understood as the wave equation in a 2D geometry. For a source placed at the origin we find for the fish-eye profile (1) the asymptotic solutions $H \sim r^{-4}$ and $H \sim$ const at infinity, neither of them forming the required logarithmic divergence of a perfect image in two dimensions. This proves that perfect imaging in the 2D fish eye is impossible for the TM polarization where the geometry is imperfect for waves. On the other hand, the 3D impedance-matched Maxwell fish eye perfectly implements the surface of a 4D hypersphere [22], a 3D curved space. We expect perfect imaging in this case.

Perfect imaging is often discussed as the amplification of evanescent waves [1], but this picture does not quite fit the imaging in Maxwell's fish eye that seems solely caused by the geometry of the sphere. Note that there is an alternative, purely geometrical picture for understanding negatively refractive perfect lenses as well [29]: they implement coordinate transformations with multiple images. What seems to matter most in perfect imaging is the geometry of light [22, 34].

It is noted that a similar proof can be applied to the generalised Luneburg profile.

Section 3: Experimental Analysis Part 1—Perfect Imaging in the Optical Domain Using Dielectric Materials The promise of perfect imaging in the optical domain, where light can be imaged without aberrations and with ultra-high resolution (unlimited in principle), could revolutionize technology and nanofabrication [1, 2, 3, 4, 5, 6]. Above, it has been shown theoretically that perfect imaging can be achieved in a dielectric medium with spatially varying refractive index [7, 8]. The lens geometry is defined using transformation optics [9, 10, 11, 12, 13, 14, 15] for projecting a spherical space onto a real plane space, forming Maxwell's fish eye [16, 17, 18, 19]. Most transformation optics demonstrations have been achieved for Euclidean spaces and in the microwave regime, due to ease of fabrication. Here we demonstrate a transformation to a non-Euclidean space [20] in the optical regime using silicon nanophotonic structures.

Maxwell's fish eye lens for perfect imaging in the optical regime requires strong variations in dielectric constant over large length scales and so has never been fully implemented in optics before [21, 22]. A designed structure 50 enabling perfect imaging in the optical regime at 1.5 µm is shown in FIG. 11a. The structure comprises a radial distribution of index with a ratio of 2:1 over several micrometers. The structure is bounded by a reflector shown here as a distributed Bragg reflector (DBR) 52 composed of silicon and air. The minimal refractive index is 1.6 at the edges 54 of the lens (close to the reflector), and the maximal is 3.2 at its centre 56. This device transfers a perfect image from a source located at any point inside the DBR to a symmetrical point relative to the centre 56 of the device. One can see the device operation in FIG. 11c where we show the simulated image formation 60 in the upper part of the device from the source 62 in the lower part of it. Note that in order to achieve sub-wavelength resolution in such a structure an outlet is necessary at the imaging point [23, 24], which could be achieved using for example a non-linear photoresist at the imaging region. Only light that is detected there is perfectly imaged, as recent experiments in the microwave regime illustrate (see Experimental Analysis part 2 in Section 4 below).

Silicon photonics has been shown as an excellent platform for tailoring index of refraction and therefore enabling transformation optics in the optical domain in dielectric structures [25, 26]. In such a platform the index is discretized by distributing sub-wavelength pillars 64 and holes 66 on a silicon wafer 67 inducing a spatial modulation of the effective index of refraction. The discretized version of the designed structure in FIG. 11a is shown in FIG. 11b. The pillars' and holes' diameter and height are 120 nm and 500 nm respectively, a size that is accessible using e-beam lithography and at the same time enables high quality uniform etching for different feature densities. We chose to work with relatively small size fish eye structure, of radius 15 µm, due to the expected scattering losses. Note that future fabrication techniques should enable one to decrease the size of the features and thus decrease the propagation losses.

Simulations show the image formation not only in the continuous fish eye structure but also in the discretized one composed of nanometer-size silicon structures. We simulated the Maxwells fish eye in time domain using Meep [27] and the results are shown in FIGS. 11c and 11d for continuous and discretised refractive index profiles respectively. One can see that, while the backscattering of the silicon structures degrades the performance of the lens, an image is clearly formed even in the discretized case shown in FIG. 11d.

Figures 12A, 12B, 12C:
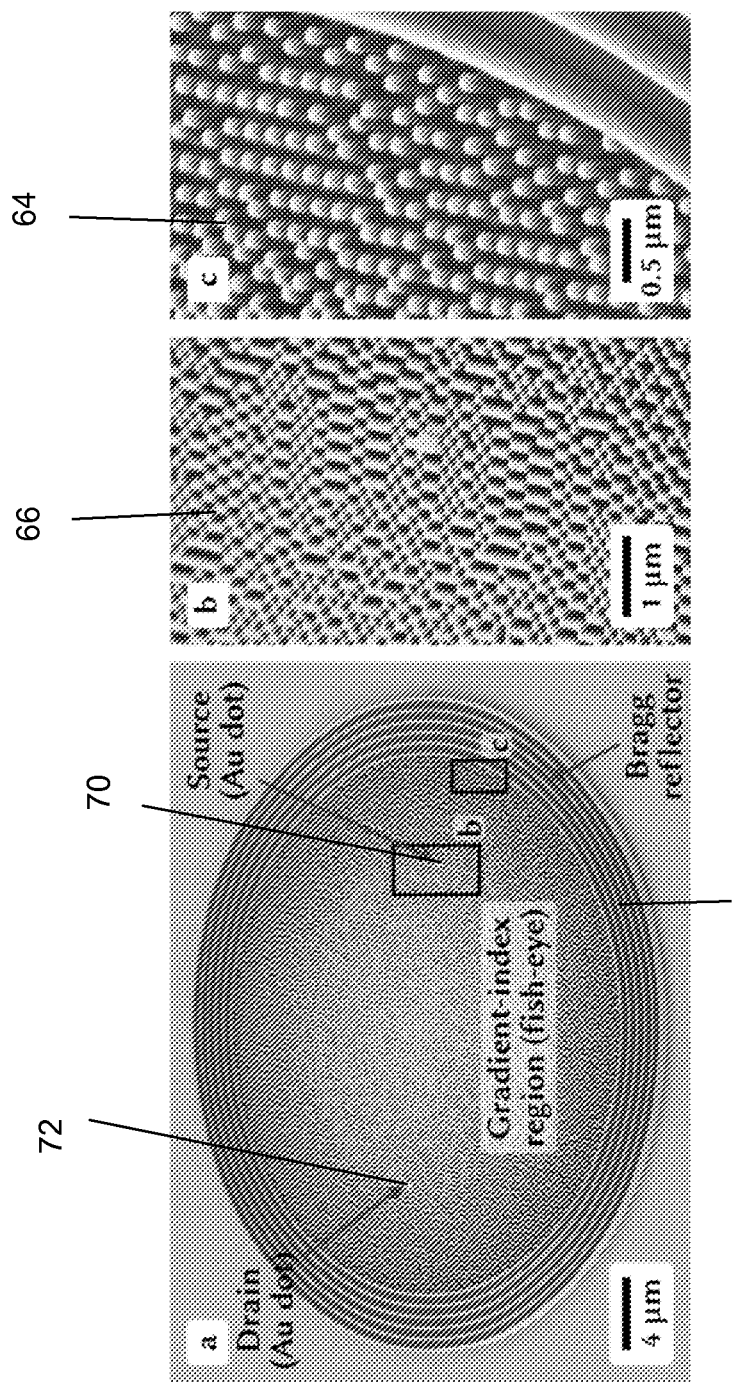
FIGS. 12A-C show scanning electron microscope images of the fish eye of the first experimental analysis described in Section 3.

To create the discretized refractive index distribution we fabricated the structure on silicon-on-insulator platform and used e-beam lithography with an optimized etching technique [25, 28], as shown in FIGS. 12a-c. On the lower refractive index regions (closer to the Bragg reflector 52), the density of silicon pillars 64 on the air background defines the local effective index. In the higher refractive index region (at the centre), we used air holes 66 in the silicon wafer layer to control the local effective index. The pillars and holes can be seen in FIGS. 12b and 12c. To pattern both types of feature in one e-beam step, a high degree of control is required on the electron dose modulation, which was achieved through an optimization of proximity effect corrections. The resist used was a 170 nm layer of XR-1541®. The 500 nm layer of silicon was etched using a highly anisotropic chlorine process. We used first and second gold dots 70, 72 with approximately 240 nm in diameter, as a source and as an outlet respectively, as shown in FIG. 12b. These dots were deposited over a lift-off mask also patterned via e-beam in a 700 nm layer of 495 k PMMA.

Figure 13:
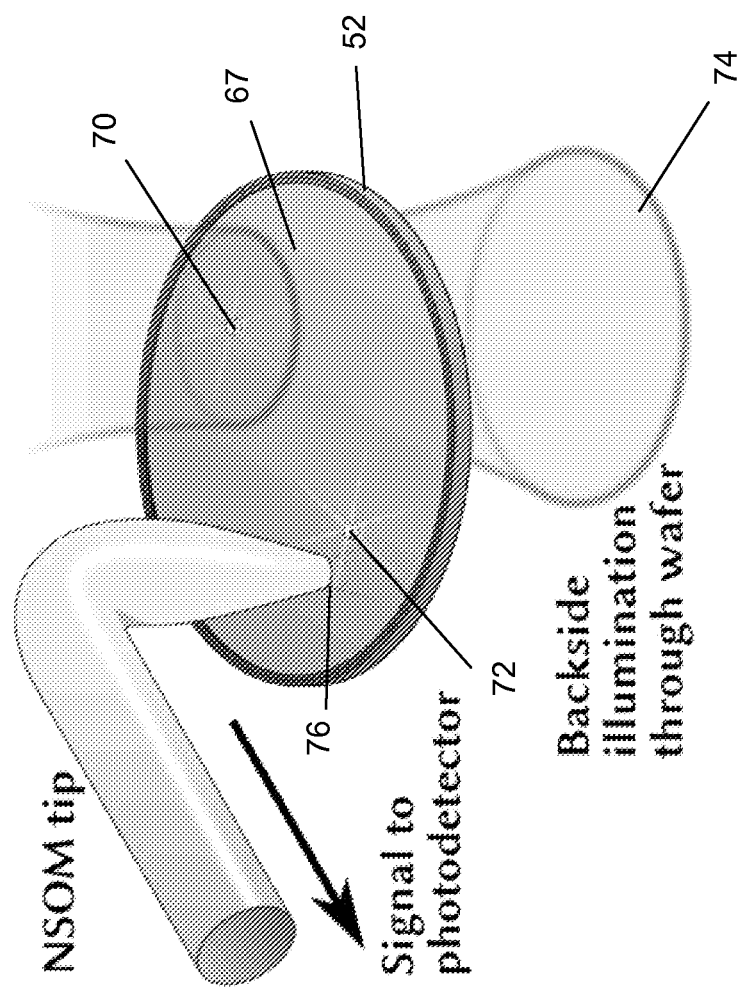
FIG. 13 is a schematic view of the experimental setup used to scan the fish eye in the first experimental analysis of Section 3. The near-field scanning microscopy (NSOM) tip has a 100 nm aperture. The source of the device was illuminated from the backside of the wafer using a 1.55 μm laser focused to an approximately 10 μm beam.

We show the image formation in the fish eye using a near-field scanning microscopy (NSOM) setup. The source 70 of the device was illuminated using a 1.55 µm laser 74 from the backside of the wafer 67 focused to an approximately 10 µm beam, as FIG. 13 shows, and the source 70 couples at least a portion of the incident laser radiation into the lens. The scanning tip 76 had a 100 nm aperture. During the scan, the tip 76 was kept at a fixed height of about 3 µm, since in contact the tip would damage the device due to the difference in size between the silicon pillars 64 and the tip itself, which greatly decreases its sensitivity to the surface. As a consequence, some far-field diffraction patterns are visible in the measurements.

Figures 14A, 14B, 14C:
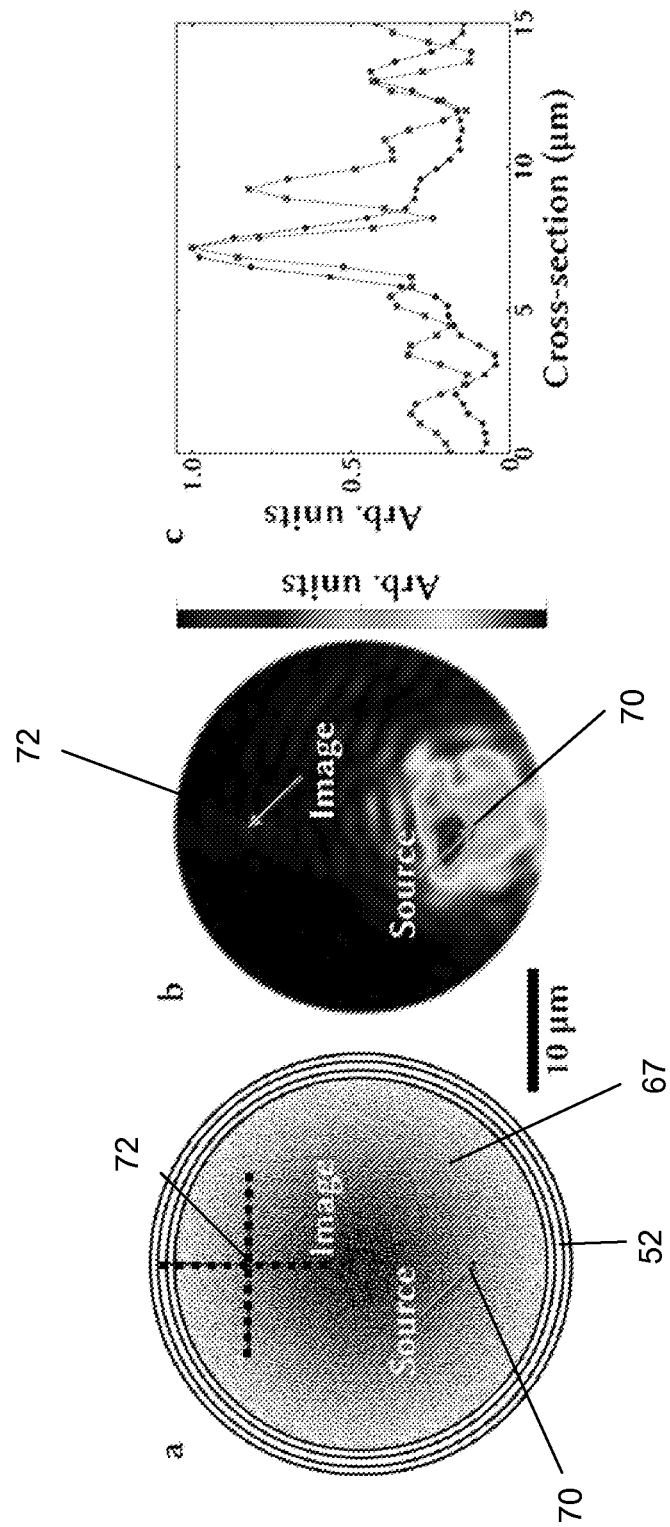
FIG. 14A is a schematic view of the measured device of the experimental analysis of Section 3; the locations of the cross-section plots are indicated by dotted lines.
FIG. 14B shows an NSOM scan of the device. The bright area on the lower half is the direct illumination from the source laser. The brighter spot on the upper half indicates the formation of an image in accordance to the simulations.
FIG. 14C is a comparison of the cross-section plots indicated in FIG. 14A showing the difference in intensity of the image point relative to its surrounding.

The results of the experiment are shown in FIG. 14. The source 70 is positioned on the lower half of the device, and the image 72 is formed on the upper half. Although it is not possible to see the source point due to the direct illumination from the laser 74 source, the image is clearly shown as a brighter spot in the expected location. The higher intensity of the image point 72 relative to its surrounding diffraction patterns can be also observed in the cross-section plots of FIG. 14c, which confirm our expectations from the simulation in FIG. 11d.

In conclusion we demonstrate an implementation of Maxwell's fish eye lens in the optical regime and image formation in the device. Advances in lithography and etching resolution as well as novel fabrication techniques for producing a continuous index profile, such as grayscale lithography, should enable the fabrication of devices with low scattering losses. The reduction on the losses would enable the measurement of such devices with sub-wavelength resolution.

The demonstration of this special lens with sub-diffraction limit resolution in even shorter wavelengths has the promise of revolutionizing nanolithography technology.

Section 4: Experimental Analysis Part 2—Perfect Imaging without Negative Refraction for Microwaves Here we demonstrate perfect imaging in Maxwell's fish eye for microwaves. Our data show that the field of a line source is imaged with subwavelength resolution over super-wavelength distances, provided the field is allowed to leave through passive outlets (which act to decouple light from the fish-eye mirror) that play the role of a detector array (such as a CCD or CMOS pixel array) in imaging (or indeed the role of a photo-resist, photographic material or the like).

As explained above, ordinary lenses cannot resolve structures much finer than the wavelength of light [1]. Perfect lenses made of negatively-refracting metamaterials were predicted [2] to image with unlimited resolution. In practice, however, such materials are absorptive for fundamental reasons [3]; perfect imaging over distances larger than the wavelength seemed impossible. As explained above, the inventors have realised that perfect imaging is in fact possible using positively refracting materials. In this section we demonstrate imaging with subwavelength resolution over superwavelength distances for microwaves in particular.

Like light, microwaves are electromagnetic waves, but with cm wavelengths and GHz frequencies, which allows us to investigate the electromagnetic fields of the imaging waves with a degree of detail currently inconceivable in optics. Instead of using negative refraction, we have implemented a positive refractive-index profile [4] that appears to curve space for electromagnetic waves [5, 6] such that they are focused with infinite precision in principle [7]. Our microwave experiment demonstrates the concepts of perfect imaging without negative refraction, in particular the role of detection in achieving perfect resolution, giving important guidance to applications where imaging matters most: for light.

Optical materials may change the spatial geometry perceived by light [6], creating optical illusions such as invisibility [8, 9]. Perfect imaging [2, 7, 10, 11] is an optical illusion as well where an object appears to be at two or more positions; as touched on above, by perfect imaging we mean the transfer of the electromagnetic field from one place to another, forming a real image at the new location with all the details of the original preserved. For example, negative refraction [2] turns out [12] to fold space [13], producing optical "carbon copies" on the folded spatial regions.

Hyperlenses [14] establish hyperbolic geometries that make magnified virtual images [15]. The device we demonstrate here, known as Maxwell's fish eye [4], creates the illusion that electromagnetic waves propagate on the surface of a virtual sphere, whereas in reality (in the 2D embodiment described above) they are confined to a planar waveguide-any point of the physical plane corresponds to a point on the virtual sphere, a curved space with non-Euclidean geometry [16].

To see why the virtual sphere acts as a perfect imaging device, consider waves continuously emitted from a source in the physical plane and imagine them on the equivalent, virtual sphere. Any source can be regarded as a collection of point sources, so it suffices to investigate the wave produced by a single point source of arbitrary position on the sphere. The wave propagates from the point of emission round the sphere and focuses at the antipodal point (see FIG. 15a) that corresponds to the image point in the physical plane. However, the focusing is perfect—infinitely sharp—only if the wave is extracted by an outlet at the image [7] (see also the Appendix to Experimental Analysis Part 2 below). By outlet we mean a point-like absorber playing the role of a detector in applications of imaging. As explained above, the detector may be, for example but not exclusively, a CCD or CMOS array, a layer of photo-resistive or photographic material or a photodiode. Without the outlet the wave runs back to the source and forms a stationary pattern lacking subwavelength focus [17, 18].

If only part of the wave manages to escape through the outlet, only that part is perfectly focused. Moreover, we observed in our experiments that when more than one outlet are offered to the wave—as in a detector array—the wave chooses the outlet closest to the correct image point, provided any outlet is within a range from the image point of about half the wavelength. The distance between the detectors may be significantly shorter than the wavelength, so the resolution is subwavelength and, in principle, can become infinitely sharp. Only the detected part of the wave is imaged with point-like precision, but as detection is the very point of imaging, this is perfectly sufficient.

Maxwell's fish eye requires a material with refractive index that varies along the distance r from the centre of the device as [4]

$$n = \frac{2n_1}{1+(r/a)^2} \qquad (37)$$

Here 'a' is a characteristic length that corresponds to the radius of the virtual sphere (it is also noted that 'a' corresponds to $r_0$ in the previous sections); the constant $n_1$ is the refractive index at r=a and also the index on the virtual sphere. In practice, it is advantageous to surround Maxwell's fish eye by a mirror [7] at radius r=a, which corresponds to a mirror around the equator of the virtual sphere (see FIG. 15b). In this case, the index profile ranges from $n_1$ at the mirror to $2n_1$ in the centre, while still creating perfect images [7] (FIG. 1b). Note that Maxwell's fish eye is an unusual "lens" where both source and image are inside the device.

Figure 15B:
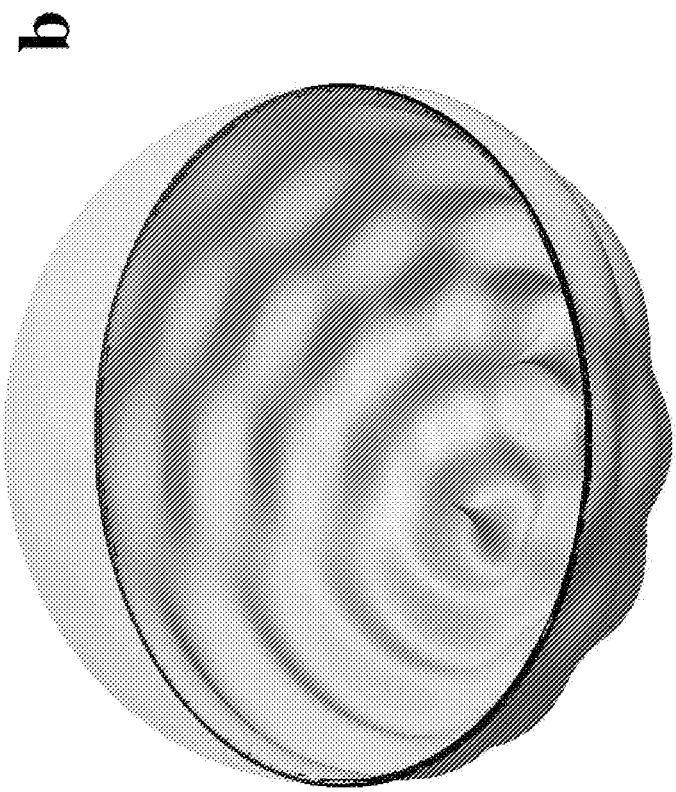
In FIG. 15B, a circular mirror is placed around the equator of the virtual sphere such that the wave is focused inside the southern hemisphere.
Figure 15A:
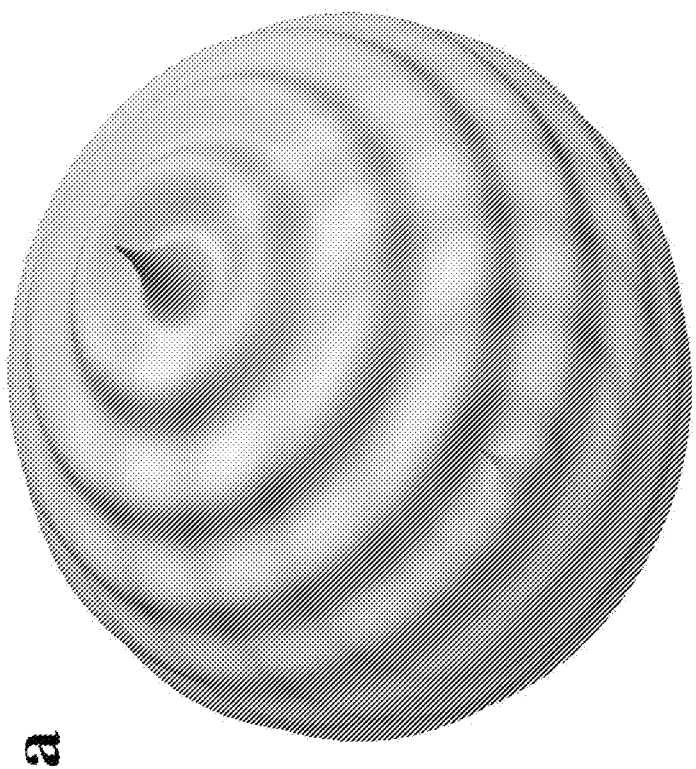
FIG. 15A shows that Maxwell's fish eye creates the illusion that light propagates on the surface of a virtual sphere. The wave from a point source (bottom left) propagates round the sphere and focuses at the antipodal point (top right).

Maxwell's fish-eye has never been made [19, 20]. We have implemented the fish eye mirror [7] for microwave radiation confined between two parallel metal plates establishing a planar waveguide [21]. The device is inserted between the plates; its index profile (37) lets microwaves in the planar waveguide behave as if they were waves on a virtual half sphere as shown in FIG. 15b. The plate separation, 5 mm, is chosen such that only microwaves with electric field perpendicular to the plates can travel inside, which is crucial for perfect imaging, because only for electromagnetic waves of this polarization does a material with electric permittivity $c=n^2$ appear to curve space perfectly [7]. Our device 80, shown in FIG. 16, resembles a microwave cloaking device [22] or a transmuted Eaton lens [23] made of concentric layers 82 of copper circuit board (Rodgers RT6006) with etched-out structures that shape its electromagnetic properties, except that the fish-eye structures respond to the electric and not the magnetic field [22, 23]. The circuit board layers are surrounded by a metal mirror 84 (which forms the reflector necessary for perfect imaging). Our structures are designed [24] for non-resonant operation such that the device can perform perfect imaging over a broad band of the spectrum. For practical reasons, we supplement some layers with dielectric powder (ECCOSTOCK Hik Powders, see FIG. 16); the metal structures and the filling material combined create the desired index profile (37) with a=5 cm, $n_1$=1. The device has a thickness of 5 mm and fits exactly between the metal plates of the waveguide.

As source in this case we use a coaxial cable inserted through the bottom plate. The cable has an outer diameter of 2.1 mm, 1.68 mm Teon isolator and 0.5 mm inner conductor; the latter is exposed by 4.5 mm in the device for creating an approximate line source. Through the source cable we inject microwave radiation of free-space wavelength $\lambda_0$=3 cm generated by a vector network analyser (HP 8722D) that doubles as synthesiser and analyser. The outlets are inserted through the bottom plate as well, but are completely passive and lead to absorbers impedance-matched to the cables. The outlets are coaxial cables with identical design as the source such that they act as sources in reverse, for maximal power extraction and best focus [25]. The field inside the waveguide is scanned by a coaxial cable inserted through the top plate that is moved in both lateral directions with 1 mm step size [21]. The cable is unexposed such that the field is minimally distorted by the detection. The scanning cable is fed into the vector network analyser where the signal is measured and decomposed into in-phase and out-of-phase components with respect to the synthesised field. Mathematically, these components correspond to the real and imaginary parts of the complex temporal Fourier amplitude taken at each scanned spatial point in the waveguide.

Figures 17A, 17B, 17C:
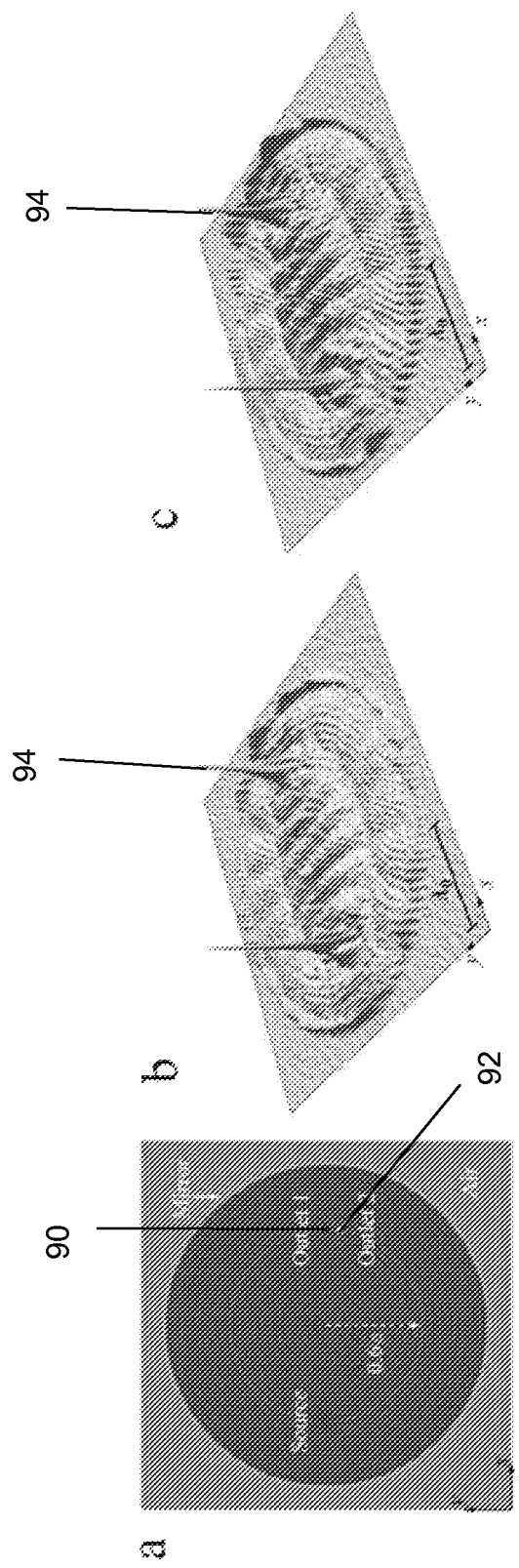
FIGS. 17A-17C show some experimental results from the analysis of Section 4.

FIG. 17a illustrates the schemes of two experiments for probing the imaging performance of Maxwell's fish eye mirror [7]. In the first experiment, we employ one outlet 90 placed at the correct imaging point with respect to the source. In the second experiment, we added another outlet 92 placed at $0.2\lambda$ distance from the first outlet 90 where $\lambda = \lambda_0/n$ is the local wavelength at the image. FIG. 17b displays the scanned field intensity (the modulus squared of the complex Fourier amplitude) clearly showing subwavelength focusing at the image spot 94. When the second outlet 92 is added, the intensity profile is nearly identical (FIG. 17c), which proves that the wave is focused at the correct outlet, even when the outlets are closer than the standard diffraction limit [1] of $0.5\lambda$.

Figures 18A, 18B:
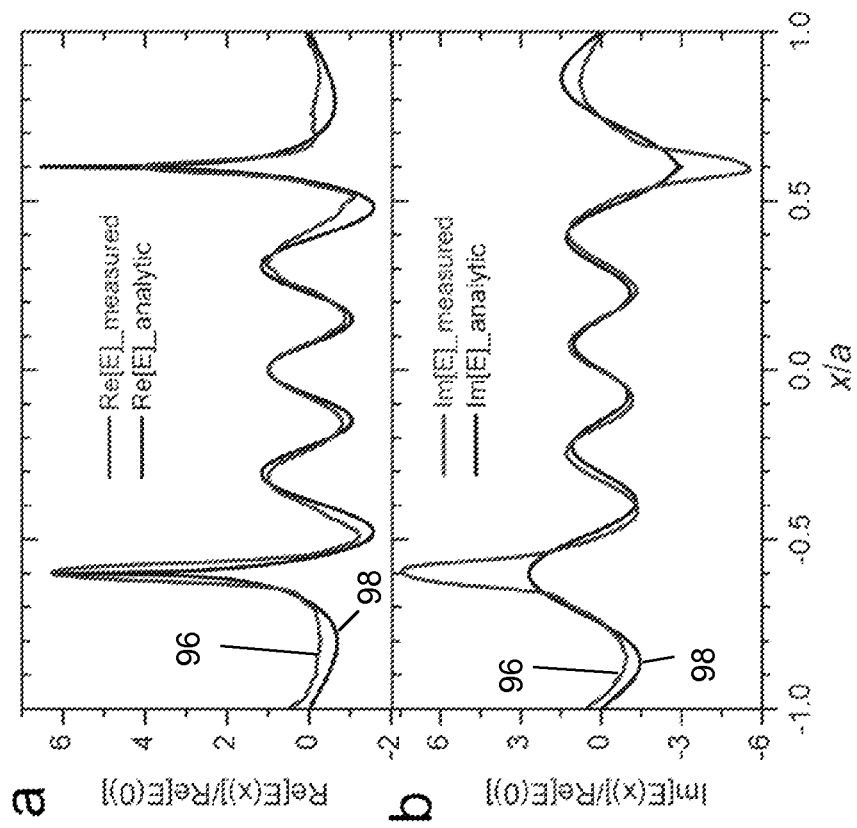
FIGS. 18A and 18B are plots comparing experimental results of the analysis of Section 4 with theoretical predictions. The field amplitude scanned along the line between source and outlet is compared with the analytical formula of a theory where the perfect index profile and an infinitely localized line source and outlet were assumed.

FIG. 18 compares the field 96 in the first experiment, scanned along the line between source and image, with the theoretical prediction 98 [7] based on assuming the perfectly smooth index profile (37) and ideal line sources. The figure shows both the real and the imaginary part of the field amplitude, thus proving that most of the injected microwave radiation establishes a running wave [18] that leaves the device at the outlet. The agreement with theory [7] is remarkably good, considering that the device is made of a structured material (rather than a graded refractive index material or a tapered waveguide) and that source and outlet are not ideal. The source launches electromagnetic waves that, in the near field, have also electric components parallel to the plates, and source and outlet have electromagnetic cross sections much larger than their geometrical size [26, 27]. It seems that at present the imaging resolution is limited by the source and the detector, which, in principle can be made perfect.

Appendix to Experimental Analysis Part 2

In this appendix we compile the analytic expressions we used for comparing our microwave data with theory and we show experimental results for imaging without outlet and hence without subwavelength resolution. For simplicity, we describe the Cartesian coordinates x and y in the plane of the waveguide in units of the device radius a and we put $n_1=1$. It is convenient to combine the two coordinates in one complex number $z=x+iz$. In this notation and with our units, the refractive-index profile of Maxwell's fish eye [4] reads $$n = \frac{2}{1+|z|^2} \quad (A1)$$

Consider stationary electromagnetic waves with wavenumber k (in our units) and electric field polarized in vertical direction. In this case the electric-field strength is characterized by only one scalar complex Fourier amplitude E that depends on k and z; we denote it by $E_k(z)$. We assume that the wave propagates inside a material with electric permittivity $\in = n^2$ and index profile (A1) surrounded by a perfect mirror at r=1. Theory [7] shows that the field of a perfect line source is given by the exact expressions $$E_k(z) = E_\nu(z) - E_\nu(1/z^*), \quad E_\nu = \frac{P_\nu(\zeta) - e^{i\nu\pi}P_\nu(-\zeta)}{4\sin(\nu\pi)}, \quad (A2)$$

where the $P_\nu$ are Legendre functions [28] with the index $$\nu = \frac{1}{2}\left(\pm\sqrt{4k^2+1} - 1\right) \quad (A3)$$

The plus sign refers to positive wavenumbers k and the minus sign to negative k (we shall need negative k for describing the field in the case without outlet). For the variable of the Legendre functions we have $$\zeta = \frac{|z'|^2 - 1}{|z'|^2 + 1}, \quad z' = \frac{z - z_0}{z_0^* z + 1} \quad (A4)$$

where $z_0$ denotes the coordinates $x_0$ and $y_0$ of the line source in complex representation $z_0 = x_0 + iy_0$. The wave function (A2) develops two logarithmic singularities [7] within the region $|z| < 1$ of the device, one at the source z0 and one at the image point.

$$z_0' = -z_0 \quad (A5)$$

This means that the wave forms an exact image with, in principle, unlimited resolution. The singularity at the image turns out [7] to carry the phase factor $\exp(i\pi\nu)$, so the phase delay is $\pi\nu$. FIG. 18 shows that expression (A2) agrees well with our data, apart from imperfections due to the finite electromagnetic size of source and image. Note that formula (A2) describes the field of a running wave that disappears through the outlet at the focal point and forms a perfect image. This outlet is a completely passive absorber that plays the role of a detector in imaging.

In the case when no outlet is present, the wave runs back to the source where it is reabsorbed, establishing a stationary wave. Imagine the stationary wave as a continuous stream of elementary ashes of radiation. Near the image (A5) each elementary wave focuses like the radiation emitted by the source run in reverse, like an advanced solution [27] of Maxwell's equations, but when the wave runs back it appears like a retarded wave [27]. Therefore, the total electromagnetic wave in the stationary regime without outlet is the superposition of an advanced and retarded wave [18].

$$E'_k(z) = \frac{E_k(z) - e^{i\pi\nu(k) - i\pi\nu(-k)}E_{-k}(z)}{1 - e^{i\pi\nu(k) - i\pi\nu(-k)}} \quad (A6)$$

One verifies that expression (A6) describes a real field with logarithmic singularity at the source, as required [18]. The real field (A6) forms a standing wave like the plane wave cos(kx) in free space, in contrast to the wave (A2) that is complex and corresponds to a running wave like exp(ikx). One also verifies that the standing wave (A6) does not develop a singularity at the image point (A5): the standing wave (A6) does not form a perfect image.

Figure 16:
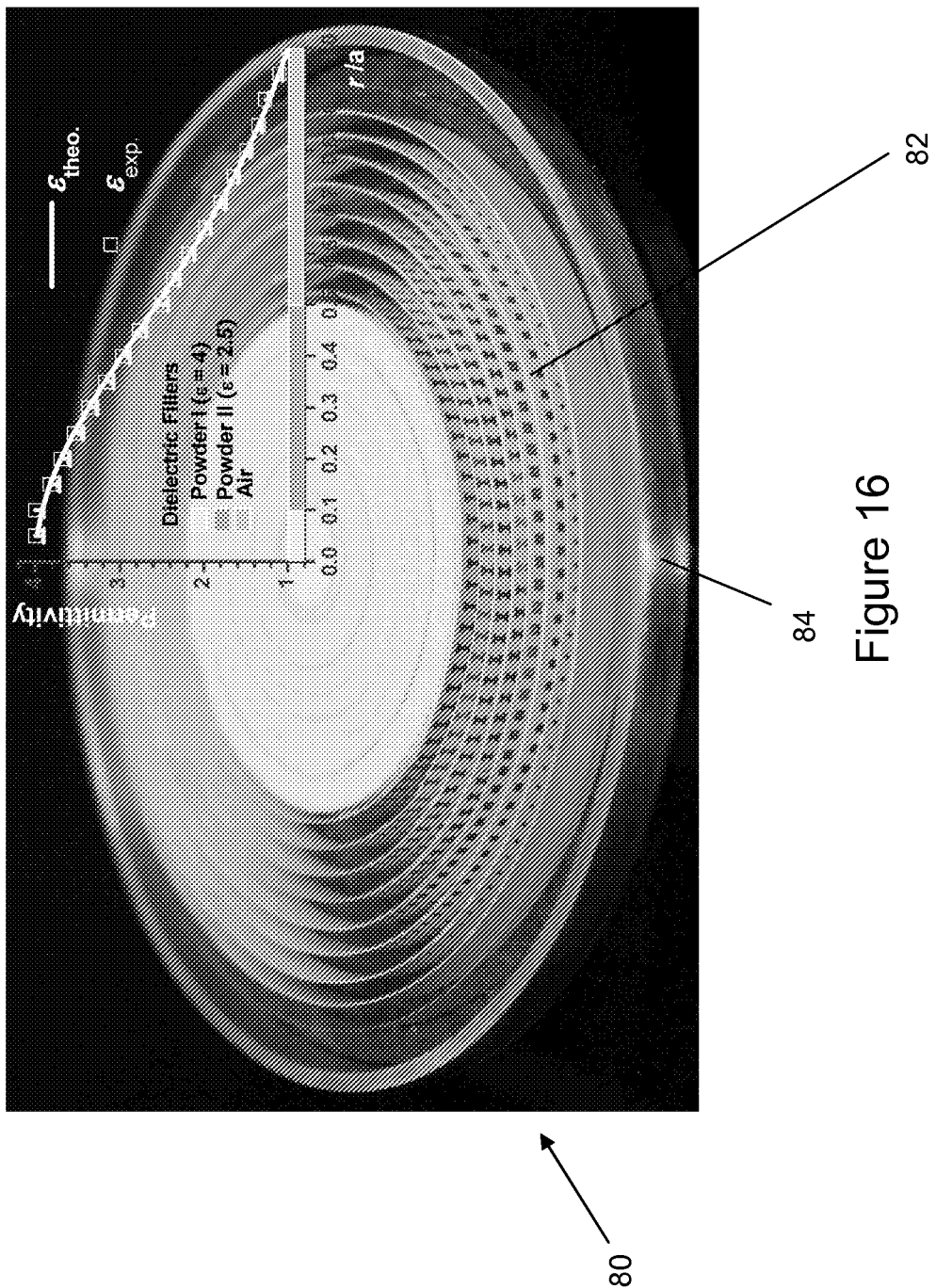
FIG. 16 shows the imaging device produced in the experimental analysis of Section 4. Copper structures on concentric layers of circuit board and dielectric fillers surrounded by a circular metal mirror create the geometry of the half sphere of FIG. 15B for microwave radiation with electric field pointing in vertical direction.
Figure 19B:
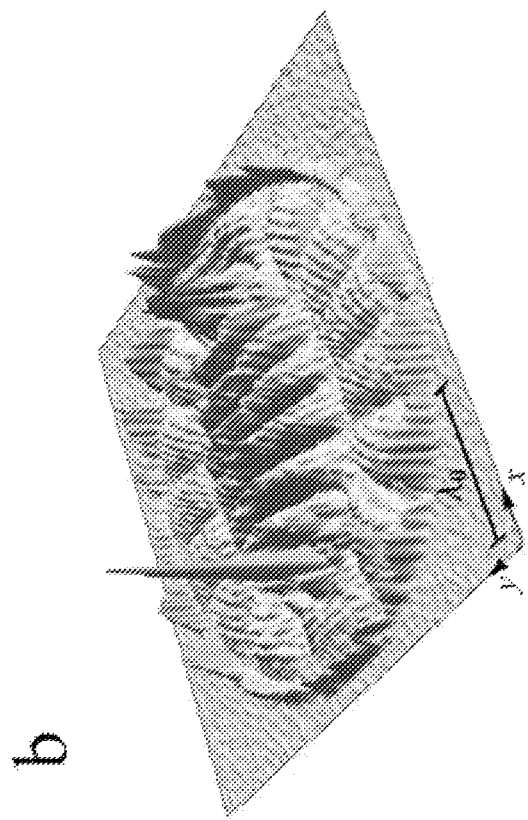
FIG. 19B shows the modulus squared of the scanned electric-field amplitude; no sharp image is formed.
Figure 19A:
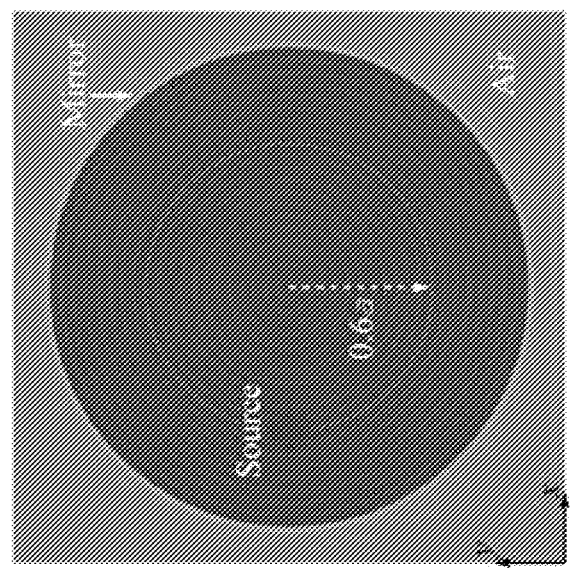
FIGS. 19A and B illustrate imaging without an outlet.
Figures 20A, 20B:
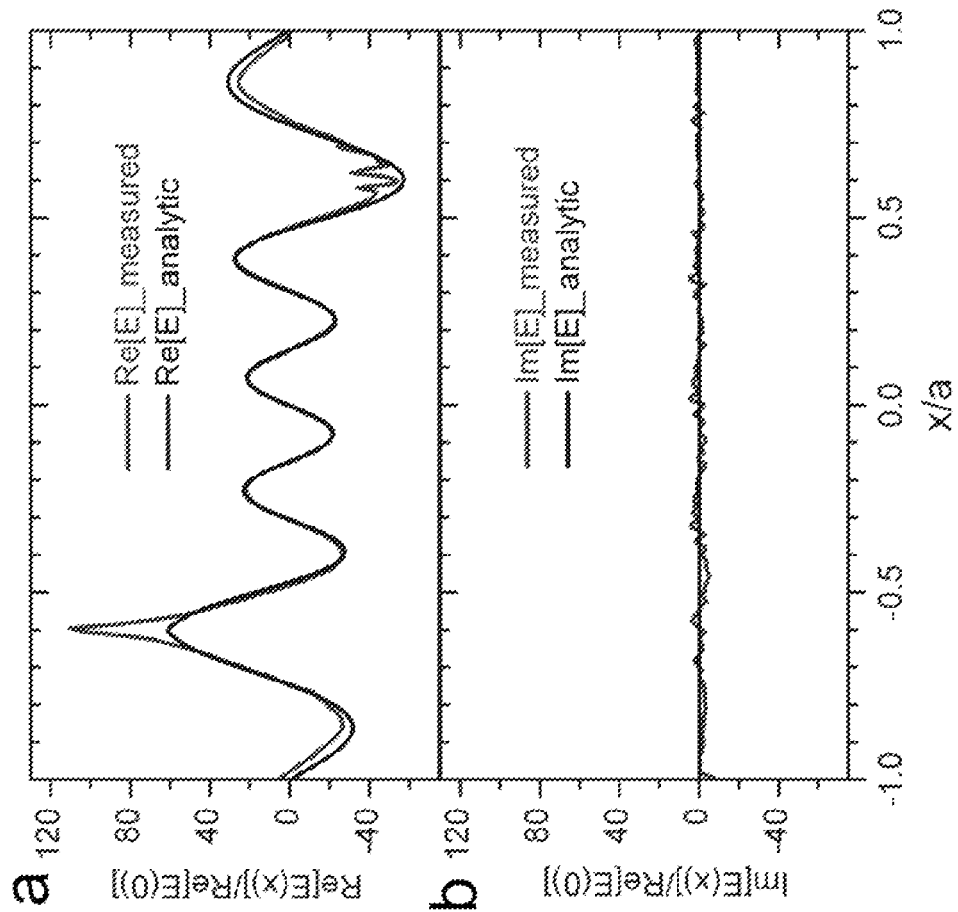
FIGS. 20A and 20B are plots comparing experimental results of Section 4 with theory. The field amplitude scanned along the line between source and outlet is compared with the analytical formula (A6).

FIG. 19 shows our experimental results for imaging without outlet, when no detector monitors the field. Instead of the sharp peak in perfect imaging with outlet (shown in FIG. 17*b*) the wave forms a diffraction-limited focus. FIG. 20 compares the measured field with formula (A6). One sees that without outlet the wave is real and so a standing wave is formed. Here theory and experiment agree even better than in the perfectly-imaging regime, because the experimental situation is simpler; the wave is not required to escape through the outlet. The subwavelength features near the image originate from the structure of the material used to implement Maxwell's fish eye, the rings 82 of circuit board (FIG. 16). As each elementary wave of the continuous radiation attempts to focus there with perfect precision before being reflected back to the source, the subwavelength structure of the device near the image becomes apparent. Our experimental results show that only the detected field is perfectly imaged in Maxwell's fish eye [4].

SUMMARY

As explained, it is commonly believed that negatively refracting materials are the key to perfect imaging devices. However, In 2009 U. Leonhardt proved by analytically solving Maxwell's equations for Maxwell's fish eye [U. Leonhardt, New J. Phys. 11, 093040 (2009), published 29 Sep. 2009] that this device has unlimited resolution (even for waves) and is not sensitive to losses. The inventors subsequently realized that Luneburg's profiles have the same property, which opens up prospects for perfect imaging in practice. Negative refraction may not be needed for perfect imaging after all, as the inventors have discovered.

It is known that, in Maxwell's 'fish eye', light rays from one point faithfully meet at another point. If light would consist of particles it would form a perfect image. But light is also a wave; and it has been believed up until now that the 'waviness' of light limits the resolution of these lenses to the diffraction limit.

Apparently, nobody did the wave calculation before. Surprisingly, the inventors have proved that Maxwell's fish eye has unlimited resolution in principle (its resolution is not limited by the wave nature of light) if an outlet is provided at the image point to decouple waves from the device. As it does not need negative refraction, such a device may also work in practice.

As well as proving the above in theory, the inventors have shown in section 3 that Maxwell's fish eye (with a reflector provided around the lens, source and outlet) can be implemented for light in the near-infrared using a structured material made in silicon. In addition, section 3 shows that perfect imaging works with Maxwell's fish eye (again with a reflector provided around the lens, source and outlet) for microwaves.

The inventors' findings were inspired by ideas for broadband invisibility where light is bent around objects to make them disappear from view. Here the ideas behind invisibility are applied for imaging.

As explained, perfect lenses according to the above disclosure could be made on silicon chips and, for example, enable chipmakers to create ever finer structures, packing more and more transistors together. Theoretical physics may spin off new technology.

To summarise, perfect imaging has been believed to rely on negative refraction, but here we show that an ordinary positively refracting optical medium may form perfect images as well. In particular, the inventors have established a mathematical proof that Maxwell's fish eye in two-dimensional (2D) integrated optics makes a perfect instrument with a resolution not limited by the wavelength of light. We have also shown how to modify the fish eye such that perfect imaging devices can be made in practice. As well as having particular applications in nanolithography and other fields of optics, this method of perfect focusing may also find applications outside of optics, in acoustics, fluid mechanics or quantum physics, wherever waves obey the 2D Helmholtz equation.

While this detailed description has set forth some embodiments of the present invention, the appended claims cover other embodiments of the present invention which may differ from the described embodiments according to various modifications and improvements.

REFERENCES

Section 1
[1] R. K. Luneburg, *Mathematical Theory of Optics* (University of California Press, Berkeley and Los Angeles, 1964).
[2] A. Hendi, J. Henn, and U. Leonhardt, Phys. Rev. Lett 97, 073902 (2006).
[3] U. Leonhardt, New J. Phys. 8, 118 (2006).
[4] Yu. N. Demkov, V. N. Ostrovsky, and N. B. Berezina, Sov-Phys. JETP 33, 867 (1971).
Section 2
[1] Pendry J B 2000 *Phys. Rev. Lett.* 85 3966
[2] Veselago V G 1968 *Sov. Phys.—Usp.* 10 509
[3] Smith D R, Pendry J B and Wiltshire M C K 2004 *Science* 305 788
[4] Soukoulis C M, Linden S and Wegener M 2007 *Science* 315 47
[5] Stockman M I 2007 *Phys. Rev. Lett.* 98 177404
[6] Maxwell J C 1854 *Camb. Dublin Math. J.* 8 188
[7] Lenz W 1928 contribution in *Probleme der Modernen Physik* ed P Debye (Leipzig: Hirzel)
[8] Stettler R 1955 *Optik* 12 529
[9] Luneburg R K 1964 *Mathematical Theory of Optics* (Berkeley, Calif.: University of California Press)
[10] Born M and Wolf E 1999 *Principles of Optics* (Cambridge: Cambridge University Press)
[11] Valentine J, Li J, Zentgraf T, Bartal G and Zhang X 2009 *Nat. Mater.* 8 568
[12] Gabrielli L H, Cardenas J, Poitras C B and Lipson M 2009 *Nat. Photonics* 3 461
[13] Lee J H, Blair J, Tamma V A, Wu Q, Rhee S J, Summers C J and Park W 2009 *Opt. Express* 17 12922
[14] Leonhardt U 2006 *Science* 312 1777
[15] Leonhardt U 2006 *New. J. Phys.* 8 118
[16] Li J and Pendry J B 2008 *Phys. Rev. Lett.* 101 203901
[17] Leonhardt U 2009 *Nat. Mater.* 8 537
[18] Tai C T 1958 *Nature* 182 1600
[19] Rosu H C and Reyes M 1994 *Nuovo Cimento D* 16 517
[20] Makowski A J and Gorska K J 2009 *Phys. Rev. A* 79 052116
[21] Greenwood A D and Jin J-M 1999 *IEEE Antennas Propag. Mag.* 41 9
[22] Leonhardt U and Philbin T G 2009 *Prog. Opt.* 53 69
[23] Leonhardt U and Tyc T 2009 *Science* 323 110
[24] Tyc T, Chen H, Chan C T and Leonhardt U 2010 *IEEE J. Select. Top. Quantum Electron.* in press (arXiv: 0906.4491)
[25] Needham T 2002 *Visual Complex Analysis* (Oxford: Clarendon)

[26] Jackson J D 1998 *Classical Electrodynamics* (New York: Wiley)
[27] Landau L D and Lifshitz E M 1993 *Electrodynamics of Continuous Media* (Oxford: Butterworth-Heinemann)
[28] Erdélyi A, Magnus W, Oberhettinger F and Tricomi F G 1981 *Higher Transcendental Functions* vol I (New York: McGraw-Hill)
[29] Leonhardt U and Philbin T G 2006 *New J. Phys.* 8 247
[30] Jacob Z, Alekseyev L V and Narimanov E 2006 *Opt. Express* 14 8247
[31] Liu Z, Lee H, Xiong Y, Sun C and Zhang X 2007 *Science* 315 1686
[32] Gurudev Dutt M V, Childress L, Jiang L, Togan E, Maze J, Jelezko F, Zibrov A S, Hemmer P R and Lukin M D 2007 *Science* 316 1312
[33] Heller E J, Crommie M F, Lutz C P and Eigler D M 1994 *Nature* 369 464
[34] Schleich W and Scully M O 1984 *General Relativity and Modern Optics in Les Houches Session XXXVIII New Trends in Atomic Physics* (Amsterdam: Elsevier) Section 3
[1] Pendry, J. Negative Refraction Makes a Perfect Lens. Phys. Rev. Lett. 85, 3966-3969 (2000).
[2] Cai, W., Genov, D. & Shalaev, V. Superlens based on metal-dielectric composites. Phys. Rev. B 72, 193101 (2005).
[3] Fang, N., Lee, H., Sun, C. & Zhang, X. Sub-diffraction-limited optical imaging with a silver superlens. Science 308, 534-7 (2005).
[4] Kawata, S., Inouye, Y. & Verma, P. Plasmonics for near-field nano-imaging and superlensing. Nat. Photon. 3, 388-394 (2009).
[5] Kildishev, A. V. & Shalaev, V. M. Engineering space for light via transformation optics. Opt. Lett. 33, 43-45 (2008).
[6] Salandrino, A. & Engheta, N. Far-field subdiffraction optical microscopy using metamaterial crystals: Theory and simulations. Phys. Rev. B 74, 75103-75105 (2006).
[7] Leonhardt, U. Perfect imaging without negative refraction. New J. Phys. 11, 093040 (2009).
[8] Benitez, P., Minano, J. C. & Gonzalez, J. C. Perfect focusing of scalar wave fields in three dimensions. Opt. Express 18, 7650 (2010).
[9] Leonhardt, U. Optical conformal mapping. Science 312, 1777-80 (2006).
[10] Pendry, J. B., Schurig, D. & Smith, D. R. Controlling Electromagnetic Fields. Science 312, 1780-1782 (2006).
[11] Schurig, D., Pendry, J. B. & Smith, D. R. Calculation of material properties and ray tracing in transformation media. Opt. Express 14, 9794 (2006).
[12] Leonhardt, U. & Philbin, T. G. General relativity in electrical engineering. New J. Phys. 8, 247 (2006).
[13] Shalaev, V. M. Physics: Transforming light. Science 322, 384-6 (2008).
[14] Chen, H., Chan, C. T. & Sheng, P. Transformation optics and metamaterials. Nat. Mater. 9, 387-96 (2010).
[15] Leonhardt, U. & Philbin, T. Geometry and Light: The Science of Invisibility (Dover Publications, 2010).
[16] Maxwell, J. C. Problem 3. Cambridge and Dublin Math. J. 8, 188 (1854).
[17] Luneburg, R. K. Mathematical theory of optics (University of California Press, 1964).
[18] Glaser, W. Maxwell's Fish Eye as an Ideal Electron Lens. Nature 162, 455-456 (1948).
[19] Tai, C. T. Maxwell Fish-eye treated by Maxwell Equations. Nature 182, 1600-1601 (1958).
[20] Leonhardt, U. & Tyc, T. Broadband invisibility by non-Euclidean cloaking. Science 323, 110-2 (2009).
[21] Fuchs, B., Lafond, O., Rondineau, S. & Himdi, M. Design and characterization of half Maxwell fish-eye lens antennas in millimeter waves. IEEE T. Microw. Theory. 54, 2292-2300 (2006).
[22] Foca, E. et al. Superlensing with plane plates consisting of dielectric cylinders in glass envelopes. Phys. Stat. Sol. (A) 206, 140-146 (2009).
[23] Blaikie, R. J. Comment on Perfect imaging without negative refraction. New J. Phys. 12, 058001 (2010).
[24] Leonhardt, U. Reply to comment on Perfect imaging without negative refraction. New J. Phys. 12, 058002 (2010).
[25] Gabrielli, L. H., Cardenas, J., Poitras, C. B. & Lipson, M. Silicon nanostructure cloak operating at optical frequencies. Nat. Photon. 3, 461-463 (2009).
[26] Valentine, J., Li, J., Zentgraf, T., Bartal, G. & Zhang, X. An optical cloak made of dielectrics. Nat. Mater. 8, 568-71 (2009).
[27] Oskooi, A. F. et al. Meep: A flexible free-software package for electromagnetic simulations by the FDTD method. Comput. Phys. Commun. 181, 687-702 (2010).
[28] Spadoti, D. H., Gabrielli, L. H., Poitras, C. B. & Lipson, M. Focusing light in a curved-space. Opt. Express 18, 3181 (2010).
Section 4
[1] Born, M. and Wolf, E. Principles of Optics (Cambridge University Press, 1999).
[2] Pendry, J. B. Negative Refraction Makes a Perfect Lens. Phys. Rev. Lett. 85, 3966-3969 (2000).
[3] Stockman, M. I. Criterion for Negative Refraction with Low Optical Losses from a Fundamental Principle of Causality. Phys. Rev. Lett. 98, 177404 (2007).
[4] Maxwell, J. C. Problem 3. Cambridge and Dublin Math. J. 8, 188-188 (1854).
[5] Luneburg, R. K. Mathematical Theory of Optics (University of California Press, 1964).
[6] Leonhardt, U. and Philbin, T. G. Geometry and Light: the Science of Invisibility (Dover, 2010).
[7] Leonhardt, U. Perfect imaging without negative refraction. New J. Phys. 11, 093040 (2009).
[8] Leonhardt, U. Optical Conformal Mapping. Science 312, 1777-1780 (2006).
[9] Pendry, J. B., Schurig, D. and Smith, D. R. Controlling Electromagnetic Fields. Science 312, 1780-1782 (2006).
[10] Leonhardt, U. and Philbin, T. G. Perfect imaging with positive refraction in three dimensions. Phys. Rev. A 81, 011804 (2010).
[11] Benitez, P., Minano, J. C. and Gonzalez, J. C. Perfect focusing of scalar wave fields in three dimensions. Opt. Express 18, 7650-7663 (2010).
[12] Leonhardt, U. and Philbin, T. G. General relativity in electrical engineering. New J. Phys. 8, 247 (2006).
[13] Chen, H., Chan, C. T. and Sheng, P. Transformation optics and metamaterials. Nature Materials 9, 387-396 (2010).
[14] Jacob, Z., Alekseyev, L. V and Narimanov, E. Optical Hyperlens: Far-field imaging beyond the di_reaction limit. Opt. Express 14, 8247-8256 (2006).
[15] Liu, Z. et al. Far-Field Optical Hyperlens Magnifying Sub-Diffraction-Limited Objects. Science 315, 1686-1686 (2007).
[16] Leonhardt, U. and Tyc, T. Broadband Invisibility by Non-Euclidean Cloaking. Science 323, 110-112 (2009).
[17] Blaikie, R. J. Comment on 'Perfect imaging without negative refraction'. New J. Phys. 12, 058001 (2010).

[18] Leonhardt, U. Reply to comment on 'Perfect imaging without negative refraction'. New J. Phys. 12, 058002 (2010).
[19] Fuchs, B., Lafond, O., Rondineau, S. and Himdi, M. Design and Characterization of Half Maxwell Fish-Eye Lens Antennas in Millimeter Waves. IEEE Transactions on Microwave Theory and Techniques 54, 2292-2300 (2006).
[20] Foca, E. et al. Superlensing with plane plates consisting of dielectric cylinders in glass envelopes. Phys. Status Solidi A 206, 140-146 (2009).
[21] Zhao, L., Chen, X. and Ong, C. K. Visual observation and quantitative measurement of the microwave absorbing e_ect at X band. Rev. Sci. Instrum. 79, 124701 (2008).
[22] Schurig, D. et al. Metamaterial Electromagnetic Cloak at Microwave Frequencies. Science 314, 977-980 (2006).
[23] Ma, Y. G., Ong, C. K., Tyc, T. and Leonhardt, U. An omnidirectional retroreflector based on the transmutation of dielectric singularities. Nature Materials 8, 639-642 (2009).
[24] Smith, D. R. and Pendry, J. B. Homogenization of metamaterials by field averaging. J. Opt. Soc. Am. B 23, 391-403 (2006).
[25] Marques, R., Freire, M. J. and Baena, J. D. Theory of three-dimensional subdiffraction imaging. Appl. Phys. Lett. 89, 211113 (2006).
[26] Combleet, S. Microwave optics: the optics of microwave antenna design (Academic Press, 1976).
[27] Jackson, J. D. Classical Electrodynamics (Wiley, 1999).
[28] Erdelyi, A., Magnus, W., Oberhettinger, F. and Tricomi, F. G. Higher Tran-scendental Functions, Vol. I (McGraw-Hill, New York, 1981).

The invention claimed is:

1. An imaging device comprising:
   a. a lens having a refractive index that varies according to a predetermined refractive index profile;
   b. a radiation source from which radiation waves are emitted or have been reflected;
   c. an outlet for decoupling waves from the device;
   d. a reflector which surrounds the lens, the source and the outlet in at least two dimensions;
   wherein the reflector and the refractive index profile of the lens are together arranged to direct said radiation waves transmitted in any of a plurality of directions from the source to the outlet along a closed trajectory;
   wherein, in the absence of the outlet, the radiation waves transmitted along the closed trajectory are directed back to the source by the lens and the reflector;
   wherein said radiation waves transmitted to the outlet comprise reflected light able to produce a desired image at said outlet; and
   wherein the outlet comprises an image detector, wave collector, or reflector.

2. The imaging device of claim 1 wherein the waves are sound waves or electromagnetic waves.

3. The imaging device of claim 1 wherein the lens, source and outlet all lie on the same plane.

4. The imaging device of claim 3 wherein the reflector surrounds the lens, source and outlet in two dimensions on said plane.

5. The imaging device of claim 3 wherein the waves are transmitted from the source in any of a plurality of directions on said plane.

6. The imaging device of claim 1 wherein the refractive index profile is a graded refractive index profile.

7. The imaging device of claim 6 wherein the refractive index profile comprises a doped dielectric.

8. The imaging device of claim 1 wherein the refractive index profile comprises a tapered waveguide.

9. The imaging device of claim 1 wherein the source comprises means for coupling waves into the device.

10. The imaging device of claim 1 wherein the outlet is opposite the source.

11. The imaging device of claim 1 wherein the outlet comprises an image detector for absorbing the transmitted waves.

12. The imaging device of claim 11 wherein the image detector comprises a layer of photo-resistive material, a photodiode, a CCD or CMOS pixel array or a layer of photographic material.

13. The imaging device of claim 1 wherein the lens comprises an isotropic dielectric.

14. The imaging device of claim 1 wherein the lens comprises the source and the outlet.

15. The imaging device of claim 14 wherein the outlet is positioned at an external surface of the lens.

16. The imaging device of claim 1 further comprising a gap between an edge of the lens and the reflector.

17. The imaging device of claim 1 wherein the reflector is adjacent the lens.

18. The imaging device of claim 1 wherein the reflector is substantially annular when viewed in plan.

19. The imaging device of claim 18 wherein the lens is located in an annulus of the reflector.

20. The imaging device of claim 19 wherein the annulus of the reflector has a larger radius than the lens.

21. The imaging device of claim 19 wherein the annulus of the reflector and the lens have substantially identical radii.

22. The imaging device of claim 18 wherein the lens is concentric with the annulus of the reflector.

23. The imaging device of claim 1 wherein the lens is substantially circular when viewed in plan.

24. The imaging device of claim 23 wherein the outlet is diametrically opposite the source.

25. The imaging device of claim 1 wherein the lens comprises silica and/or silicon nitride.

26. The imaging device of claim 1 wherein the lens is rotationally symmetric and varies along a radius r with the refractive index profile n(r) given by the following implicit equations:

$$r(\rho) = \rho \exp\left(-\frac{2}{\pi}\int_\rho^{r_0} \frac{\arcsin(b/r_1)}{\sqrt{b^2-\rho^2}} db\right)$$

$$n = \rho/r(\rho)$$

wherein:
   $\rho$ is a parameter ranging from 0 to $r_0$;
   $r_0$ is the radius of the lens;
   $r_1$ is the radius of the reflector; and
   b is an integration variable.

27. The imaging device of claim 26 wherein the lens has a maximum refractive index, $n_0$, which conforms with the following equation:

$$n_0 = \exp\left(\frac{2}{\pi}\int_0^{r_0} \arcsin(b/r_1)\frac{db}{b}\right) = \exp\left(\frac{2}{\pi}\int_0^{r_0/r_1} \arcsin\xi \frac{d\xi}{\xi}\right)$$

wherein:
   $r_0$ is the radius of the lens;
   $r_1$ is the radius of the reflector; and
   $\xi$ is an integration variable.

28. The imaging device of claim 1 wherein the lens is substantially planar.

29. The imaging device of claim 28 wherein the waves are electromagnetic waves, the electric field component of which is substantially perpendicular to the plane of the lens.

30. The imaging device of claim 1 wherein the permittivity of the lens is equal to the square of its refractive index.

31. An imaging method using an imaging device comprising:
   a. a lens having a refractive index that varies according to a predetermined refractive index profile;
   b. a radiation source from which radiation waves are emitted or have been reflected;
   c. an outlet for decoupling waves from the device, the outlet comprising an image detector, wave collector or reflector; and
   d. a reflector which surrounds the lens, the source and the outlet in at least two dimensions;
   the method comprising:
      transmitting said radiation waves from the source in a plurality of directions;
      using the lens and the reflector to direct the transmitted waves to the outlet along a closed trajectory;
      wherein, in the absence of the outlet, the radiation waves transmitted along the closed trajectory are directed back to the source by the lens and the reflector; and
      decoupling at least a portion of the directed waves from the device using the outlet.

32. The imaging method of claim 31 wherein the step of transmitting waves from the source comprises transmitting waves from the source omnidirectionally.

33. The imaging method of claim 31, further comprising focusing a plurality of waves at the outlet.

34. The imaging method of claim 31 wherein the lens, source and outlet all lie on the same plane.

35. The imaging method of claim 31 wherein the lens is substantially planar.

36. The imaging method of claim 35 wherein the waves are electromagnetic waves, the electric field component of which is substantially perpendicular to the plane of the lens.

37. The imaging method of claim 35 wherein the waves are transmitted from the source in the plane of the lens.

* * * * *